(12) United States Patent
Manolakos et al.

(10) Patent No.: US 12,335,000 B2
(45) Date of Patent: Jun. 17, 2025

(54) SUBBAND-SPECIFIC CODEBOOK SUBSET RESTRICTION

(71) Applicant: QUALCOMM INCORPORATED, San Diego, CA (US)

(72) Inventors: Alexandros Manolakos, Escondido, CA (US); Yu Zhang, San Diego, CA (US); Ahmed Attia Abotabl, San Diego, CA (US); Runxin Wang, San Diego, CA (US); Muhammad Sayed Khairy Abdelghaffar, San Jose, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 308 days.

(21) Appl. No.: 17/907,931

(22) PCT Filed: Apr. 7, 2020

(86) PCT No.: PCT/CN2020/083465
§ 371 (c)(1),
(2) Date: Aug. 29, 2022

(87) PCT Pub. No.: WO2021/203233
PCT Pub. Date: Oct. 14, 2021

(65) Prior Publication Data
US 2023/0144233 A1    May 11, 2023

(51) Int. Cl.
*H04B 7/0456* (2017.01)
*H04B 7/06* (2006.01)
*H04L 5/00* (2006.01)

(52) U.S. Cl.
CPC ......... *H04B 7/0478* (2013.01); *H04B 7/0658* (2013.01); *H04L 5/0094* (2013.01)

(58) Field of Classification Search
CPC .. H04B 7/0478; H04B 7/0658; H04B 7/0417; H04B 7/0481; H04B 7/0626; H04B 7/0456; H04L 5/0094; H04W 24/10
See application file for complete search history.

(56) References Cited

U.S. PATENT DOCUMENTS 10,461,908 B2 * 10/2019 Patel .............. H04L 5/0044
2017/0141827 A1 * 5/2017 Liu .............. H04L 5/0048
(Continued)

FOREIGN PATENT DOCUMENTS

| CN | 110050427 A | 7/2019 |
|---|---|---|
| EP | 3382903 A1 | 10/2018 |
| WO | WO-2016122396 A2 | 8/2016 |

OTHER PUBLICATIONS

Intel Corporation: "On Codebook Based UL Subband Precoding," R1-1702192, 3GPP TSG-RAN WG1 #88, Feb. 13-17, 2017 (Feb. 17, 2017), pp. 1-3, the whole document.
(Continued)

*Primary Examiner* — Jung H Park
(74) *Attorney, Agent, or Firm* — Paul M. McAdams; Holland & Hart LLP

(57) ABSTRACT

Methods, systems, and devices for wireless communications are described. A user equipment (UE) may receive a first configuration of one or more channel state information reference signal resources and a second configuration of a channel state information report associated with the one or more channel state information reference signal resources. In some cases, the second configuration may include at least one of an indication of a codebook, a set of codebook restriction sets, and a configured bandwidth. The UE may then identify a mapping between one or more frequency-domain subbands of the configured bandwidth and each codebook restriction set of the set of codebook restriction sets, and transmit, to the base station, a report indicating one (Continued)

or more precoding matrix indicators from the codebook for each of the one or more frequency-domain subbands based on the mapping.

19 Claims, 18 Drawing Sheets

(56) References Cited

U.S. PATENT DOCUMENTS

| | | | |
|---|---|---|---|
| 2017/0310435 A1 | 10/2017 | Wei et al. | |
| 2018/0198497 A1 | 7/2018 | Wei et al. | |
| 2019/0082424 A1 | 3/2019 | Nammi et al. | |
| 2020/0014450 A1* | 1/2020 | Park | H04B 7/0617 |
| 2020/0053764 A1 | 2/2020 | Kim et al. | |
| 2020/0145062 A1* | 5/2020 | Jung | H04W 72/23 |
| 2020/0186207 A1* | 6/2020 | Davydov | H04B 7/0469 |

OTHER PUBLICATIONS

International Search Report and Written Opinion—PCT/CN2020/083465—ISA/EPO—Dec. 30, 2020 (203245WO1).
Supplementary European Search Report—EP20930563—Search Authority—Munich—Dec. 6, 2023 (203245EP).
AT&T: "On Codebook Subset Restriction for NR", R1-1716178, 3GPP TSG RAN WG1 Meeting AH_NR#3 Nagoya, Japan, Sep. 18-21, 2017, pp. 1-4.

* cited by examiner

SUBBAND-SPECIFIC CODEBOOK SUBSET RESTRICTION

CROSS REFERENCE

The present Application is a 371 national stage filing of International PCT Application No. PCT/CN2020/083465 by MANOLAKOS et al. entitled "SUBBAND-SPECIFIC CODEBOOK SUBSET RESTRICTION," filed Apr. 7, 2020, which is assigned to the assignee hereof, and which is expressly incorporated by reference in its entirety herein.

FIELD OF TECHNOLOGY

The following relates generally to wireless communications and more specifically to subband-specific codebook subset restriction.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may be configured to report channel state information to a base station. The base station may use the channel state information to identify configurations for transmitting downlink signals to the UE. In one example, a UE may transmit a precoding matrix indicator to the base station in a channel state information report.

SUMMARY

The described techniques relate to improved methods, systems, devices, and apparatuses that support subband-specific codebook subset restriction. Generally, the described techniques provide for subband-specific codebook subset restrictions which may account for the self-interference between uplink communication and downlink communication at a base station. In some wireless communications systems, a base station may precode downlink signals to be transmitted to a user equipment (UE) using a precoding matrix. A preferred or suggested precoding matrix for the base station to use may be selected by a UE from a number of precoding matrices (e.g., a codebook) and reported to the base station in a channel state information report. As described herein, a base station may support techniques for limiting a number of precoding matrices that a UE may evaluate to identify a preferred precoding matrix to be indicated to the base station. For example, a base station operating in a full duplex mode may configure codebook subset restriction sets that are associated with frequency-domain subbands (e.g., such that the UE may avoid selecting a precoder from the codebook that the base station knows may cause interference). Specifically, the techniques described herein allow a UE to receive a first configuration of a channel state information report associated with one or more channel state information reference signal resources. In some cases, a second configuration may include at least one of an indication of a codebook, multiple codebook restriction sets, and a configured bandwidth. The UE may then identify a mapping between one or more frequency-domain subbands of the configured bandwidth and each codebook restriction set of the multiple codebook restriction sets. The UE may then transmit the channel state information report according to the identified mapping.

A method of wireless communication at a UE is described. The method may include receiving a first configuration of one or more channel state information reference signal resources, receiving a second configuration of a channel state information report associated with the one or more channel state information reference signal resources, the second configuration including at least one of an indication of a codebook, a set of codebook restriction sets, and a configured bandwidth, identifying a mapping between one or more frequency-domain subbands of the configured bandwidth and each codebook restriction set of the set of codebook restriction sets, and transmitting, to the base station, a report indicating one or more precoding matrix indicators from the codebook for each of the one or more frequency-domain subbands based on the mapping.

An apparatus for wireless communication at a UE is described. The apparatus may include a processor, memory coupled with the processor, and instructions stored in the memory. The instructions may be executable by the processor to cause the apparatus to receive a first configuration of one or more channel state information reference signal resources, receive a second configuration of a channel state information report associated with the one or more channel state information reference signal resources, the second configuration including at least one of an indication of a codebook, a set of codebook restriction sets, and a configured bandwidth, identify a mapping between one or more frequency-domain subbands of the configured bandwidth and each codebook restriction set of the set of codebook restriction sets, and transmit, to the base station, a report indicating one or more precoding matrix indicators from the codebook for each of the one or more frequency-domain subbands based on the mapping.

Another apparatus for wireless communication at a UE is described. The apparatus may include means for receiving a first configuration of one or more channel state information reference signal resources, receiving a second configuration of a channel state information report associated with the one or more channel state information reference signal resources, the second configuration including at least one of an indication of a codebook, a set of codebook restriction sets, and a configured bandwidth, identifying a mapping between one or more frequency-domain subbands of the configured bandwidth and each codebook restriction set of the set of codebook restriction sets, and transmitting, to the base station, a report indicating one or more precoding matrix indicators from the codebook for each of the one or more frequency-domain subbands based on the mapping.

A non-transitory computer-readable medium storing code for wireless communication at a UE is described. The code may include instructions executable by a processor to receive a first configuration of one or more channel state information reference signal resources, receive a second configuration of a channel state information report associated with the one or more channel state information reference signal resources, the second configuration including at least one of an indication of a codebook, a set of codebook restriction sets, and a configured bandwidth, identify a mapping between one or more frequency-domain subbands of the configured bandwidth and each codebook restriction set of the set of codebook restriction sets, and transmit, to the base station, a report indicating one or more precoding matrix indicators from the codebook for each of the one or more frequency-domain subbands based on the mapping.

Some examples of the method, apparatuses, and non-transitory computer-readable medium described herein may further include operations, features, means, or instructions for identifying, based on a configuration of a time period for downlink transmissions, an uplink portion within the time period and a downlink portion within the time period, where the mapping may be based on the uplink portion and the downlink portion.

In some examples of the method, apparatuses, and non-transitory computer-readable medium described herein, identifying the mapping further may include operations, features, means, or instructions for identifying the mapping between a first codebook restriction set and a threshold number of physical resource blocks from the uplink portion within the time period, and identifying the mapping between a second codebook restriction set and a remaining number of physical resource blocks within the time period.

Some examples of the method, apparatuses, and non-transitory computer-readable medium described herein may further include operations, features, means, or instructions for receiving, from the base station, a signal indicating the threshold number of physical resource blocks.

In some examples of the method, apparatuses, and non-transitory computer-readable medium described herein, the uplink portion includes an uplink bandwidth part and the downlink portion includes a downlink bandwidth part. In some examples of the method, apparatuses, and non-transitory computer-readable medium described herein, the uplink portion and the downlink portion may be concurrently included in the same component carrier and the same symbol.

Some examples of the method, apparatuses, and non-transitory computer-readable medium described herein may further include operations, features, means, or instructions for identifying, based on a configuration of a time period for downlink transmissions, a first set of physical resource blocks associated with an uplink portion, identifying, based on the configuration of the time period, a second set of physical resource blocks associated with a downlink portion, and determining a boundary between the uplink portion and the downlink portion, where the mapping may be based on the boundary.

In some examples of the method, apparatuses, and non-transitory computer-readable medium described herein, identifying the mapping further may include operations, features, means, or instructions for identifying the mapping between a first codebook restriction set and a subset of the second set of physical resource blocks located within a threshold distance from the boundary between the uplink portion and the downlink portion, and identifying the mapping between a second codebook restriction set and a remaining number of the second set of physical resource blocks within the time period.

In some examples of the method, apparatuses, and non-transitory computer-readable medium described herein, the first set of physical resource blocks and the second set of physical resource blocks may be associated with a component carrier. Some examples of the method, apparatuses, and non-transitory computer-readable medium described herein may further include operations, features, means, or instructions for identifying, based on a configuration of a time period for downlink transmissions, a guard band within the time period, and determining a threshold number of physical resource blocks from the guard band within the time period, where identifying the mapping may be based on the identifying the guard band.

In some examples of the method, apparatuses, and non-transitory computer-readable medium described herein, identifying the mapping further may include operations, features, means, or instructions for identifying the mapping between a first codebook restriction set and the threshold number of physical resource blocks from the guard band within the time period, and identifying the mapping between a second codebook restriction set and a remaining number of physical resource blocks within the time period.

Some examples of the method, apparatuses, and non-transitory computer-readable medium described herein may further include operations, features, means, or instructions for identifying a set of frequency-domain subbands associated with a downlink bandwidth part, where identifying the mapping may be based on identifying the set of frequency-domain subbands.

In some examples of the method, apparatuses, and non-transitory computer-readable medium described herein, identifying the mapping further may include operations, features, means, or instructions for identifying the mapping between a codebook restriction set with each frequency-domain subband of the set of frequency-domain subbands based on identifying the set of frequency-domain subbands.

In some examples of the method, apparatuses, and non-transitory computer-readable medium described herein, identifying the mapping further may include operations, features, means, or instructions for identifying the mapping between a first codebook restriction set and a first set of frequency-domain subbands of the set of frequency-domain subbands, and identifying the mapping between a second codebook restriction set and a remaining set of frequency-domain subbands of the set of frequency-domain subbands.

Some examples of the method, apparatuses, and non-transitory computer-readable medium described herein may further include operations, features, means, or instructions for receiving a control message from the base station, and identifying the set of codebook restriction sets associated with the codebook based on the control message. Some examples of the method, apparatuses, and non-transitory computer-readable medium described herein may further include operations, features, means, or instructions for identifying one or more bits included in the control message, and identifying the mapping between the one or more frequency-domain subbands of the configured bandwidth and each codebook restriction set based on identifying the one or more bits.

In some examples of the method, apparatuses, and non-transitory computer-readable medium described herein, the control message includes at least one of downlink control information, a MAC control element, or a combination thereof. Some examples of the method, apparatuses, and non-transitory computer-readable medium described herein may further include operations, features, means, or instructions for receiving a control message from the base station, and updating the mapping between the one or more frequency-domain subbands of the configured bandwidth and each codebook restriction set based on the control message.

Some examples of the method, apparatuses, and non-transitory computer-readable medium described herein may further include operations, features, means, or instructions for transmitting, to the base station, a UE capability message indicating a capability of the UE to support the set of codebook restriction sets, where the mapping may be based on the UE capability message.

In some examples of the method, apparatuses, and non-transitory computer-readable medium described herein, the set of codebook restriction sets may be associated with at least one of a single panel codebook, a multi-panel codebook, or a combination thereof. In some examples of the method, apparatuses, and non-transitory computer-readable medium described herein, the report may be associated with full-duplex communication.

In some examples of the method, apparatuses, and non-transitory computer-readable medium described herein, the one or more frequency-domain subbands of the configured bandwidth may be contiguous. In some examples of the method, apparatuses, and non-transitory computer-readable medium described herein, the one or more frequency-domain subbands of the configured bandwidth may be non-contiguous.

A method of wireless communication at a base station is described. The method may include transmitting a first configuration of one or more channel state information reference signal resources, transmitting a second configuration of a channel state information report associated with the one or more channel state information reference signal resources, the second configuration including at least one of an indication of a codebook, a set of codebook restriction sets, and a configured bandwidth, identifying a mapping between one or more frequency-domain subbands of the configured bandwidth and each codebook restriction set of the set of codebook restriction sets, and receiving, from a UE, a report indicating one or more precoding matrix indicators from the codebook for each of the one or more frequency-domain subbands based on the mapping.

An apparatus for wireless communication at a base station is described. The apparatus may include a processor, memory coupled with the processor, and instructions stored in the memory. The instructions may be executable by the processor to cause the apparatus to transmit a first configuration of one or more channel state information reference signal resources, transmit a second configuration of a channel state information report associated with the one or more channel state information reference signal resources, the second configuration including at least one of an indication of a codebook, a set of codebook restriction sets, and a configured bandwidth, identify a mapping between one or more frequency-domain subbands of the configured bandwidth and each codebook restriction set of the set of codebook restriction sets, and receive, from a UE, a report indicating one or more precoding matrix indicators from the codebook for each of the one or more frequency-domain subbands based on the mapping.

Another apparatus for wireless communication at a base station is described. The apparatus may include means for transmitting a first configuration of one or more channel state information reference signal resources, transmitting a second configuration of a channel state information report associated with the one or more channel state information reference signal resources, the second configuration including at least one of an indication of a codebook, a set of codebook restriction sets, and a configured bandwidth, identifying a mapping between one or more frequency-domain subbands of the configured bandwidth and each codebook restriction set of the set of codebook restriction sets, and receiving, from a UE, a report indicating one or more precoding matrix indicators from the codebook for each of the one or more frequency-domain subbands based on the mapping.

A non-transitory computer-readable medium storing code for wireless communication at a base station is described. The code may include instructions executable by a processor to transmit a first configuration of one or more channel state information reference signal resources, transmit a second configuration of a channel state information report associated with the one or more channel state information reference signal resources, the second configuration including at least one of an indication of a codebook, a set of codebook restriction sets, and a configured bandwidth, identify a mapping between one or more frequency-domain subbands of the configured bandwidth and each codebook restriction set of the set of codebook restriction sets, and receive, from a UE, a report indicating one or more precoding matrix indicators from the codebook for each of the one or more frequency-domain subbands based on the mapping.

Some examples of the method, apparatuses, and non-transitory computer-readable medium described herein may further include operations, features, means, or instructions for identifying, based on a configuration of a time period for downlink transmissions, an uplink portion within the time period and a downlink portion within the time period, where the mapping may be based on the uplink portion and the downlink portion.

In some examples of the method, apparatuses, and non-transitory computer-readable medium described herein, identifying the mapping further may include operations, features, means, or instructions for identifying the mapping between a first codebook restriction set and a threshold number of physical resource blocks from the uplink portion within the time period, and identifying the mapping between a second codebook restriction set and a remaining number of physical resource blocks within the time period.

Some examples of the method, apparatuses, and non-transitory computer-readable medium described herein may further include operations, features, means, or instructions for transmitting, to the UE, a signal indicating the threshold number of physical resource blocks.

In some examples of the method, apparatuses, and non-transitory computer-readable medium described herein, the uplink portion includes an uplink bandwidth part and the downlink portion includes a downlink bandwidth part. In some examples of the method, apparatuses, and non-transitory computer-readable medium described herein, the uplink portion and the downlink portion may be concurrently included in the same component carrier and the same symbol.

Some examples of the method, apparatuses, and non-transitory computer-readable medium described herein may further include operations, features, means, or instructions for identifying, based on a configuration of a time period for downlink transmissions, a first set of physical resource blocks associated with an uplink portion, identifying, based on the configuration of the time period, a second set of physical resource blocks associated with a downlink portion, and determining a boundary between the uplink portion and the downlink portion, where the mapping may be based on the boundary.

In some examples of the method, apparatuses, and non-transitory computer-readable medium described herein, identifying the mapping further may include operations, features, means, or instructions for identifying the mapping between a first codebook restriction set and a subset of the second set of physical resource blocks located within a threshold distance from the boundary between the uplink portion and the downlink portion, and identifying the mapping between a second codebook restriction set and a remaining number of the second set of physical resource blocks within the time period.

In some examples of the method, apparatuses, and non-transitory computer-readable medium described herein, the first set of physical resource blocks and the second set of physical resource blocks may be associated with a component carrier. Some examples of the method, apparatuses, and non-transitory computer-readable medium described herein may further include operations, features, means, or instructions for identifying, based on a configuration of a time period for downlink transmissions, a guard band within the time period, and determining a threshold number of physical resource blocks from the guard band within the time period, where identifying the mapping may be based on the identifying the guard band.

In some examples of the method, apparatuses, and non-transitory computer-readable medium described herein, identifying the mapping further may include operations, features, means, or instructions for identifying the mapping between a first codebook restriction set and the threshold number of physical resource blocks from the guard band within the time period, and identifying the mapping between a second codebook restriction set and a remaining number of physical resource blocks within the time period.

Some examples of the method, apparatuses, and non-transitory computer-readable medium described herein may further include operations, features, means, or instructions for identifying a set of frequency-domain subbands associated with a downlink bandwidth part, where identifying the mapping may be based on identifying the set of frequency-domain subbands.

In some examples of the method, apparatuses, and non-transitory computer-readable medium described herein, identifying the mapping further may include operations, features, means, or instructions for identifying the mapping between a codebook restriction set with each frequency-domain subband of the set of frequency-domain subbands based on identifying the set of frequency-domain subbands.

In some examples of the method, apparatuses, and non-transitory computer-readable medium described herein, identifying the mapping further may include operations, features, means, or instructions for identifying the mapping between a first codebook restriction set and a first set of frequency-domain subbands of the set of frequency-domain subbands, and identifying the mapping between a second codebook restriction set and a remaining set of frequency-domain subbands of the set of frequency-domain subbands.

Some examples of the method, apparatuses, and non-transitory computer-readable medium described herein may further include operations, features, means, or instructions for transmitting a control message to the UE, and identifying the set of codebook restriction sets associated with the codebook based on the control message. Some examples of the method, apparatuses, and non-transitory computer-readable medium described herein may further include operations, features, means, or instructions for identifying one or more bits included in the control message, and identifying the mapping between the one or more frequency-domain subbands of the configured bandwidth and each codebook restriction set based on identifying the one or more bits.

In some examples of the method, apparatuses, and non-transitory computer-readable medium described herein, the control message includes at least one of downlink control information, a MAC control element, or a combination thereof.

Some examples of the method, apparatuses, and non-transitory computer-readable medium described herein may further include operations, features, means, or instructions for transmitting a control message to the UE, and updating the mapping between the one or more frequency-domain subbands of the configured bandwidth and each codebook restriction set based on the control message.

Some examples of the method, apparatuses, and non-transitory computer-readable medium described herein may further include operations, features, means, or instructions for receiving, from the UE, a UE capability message indicating a capability of the UE to support the set of codebook restriction sets, where the mapping may be based on the UE capability message.

In some examples of the method, apparatuses, and non-transitory computer-readable medium described herein, the set of codebook restriction sets may be associated with at least one of a single panel codebook, a multi-panel codebook, or a combination thereof. In some examples of the method, apparatuses, and non-transitory computer-readable medium described herein, the report may be associated with full-duplex communication.

In some examples of the method, apparatuses, and non-transitory computer-readable medium described herein, the one or more frequency-domain subbands of the configured bandwidth may be contiguous. In some examples of the method, apparatuses, and non-transitory computer-readable medium described herein, the one or more frequency-domain subbands of the configured bandwidth may be non-contiguous.

DETAILED DESCRIPTION

Figure 1:
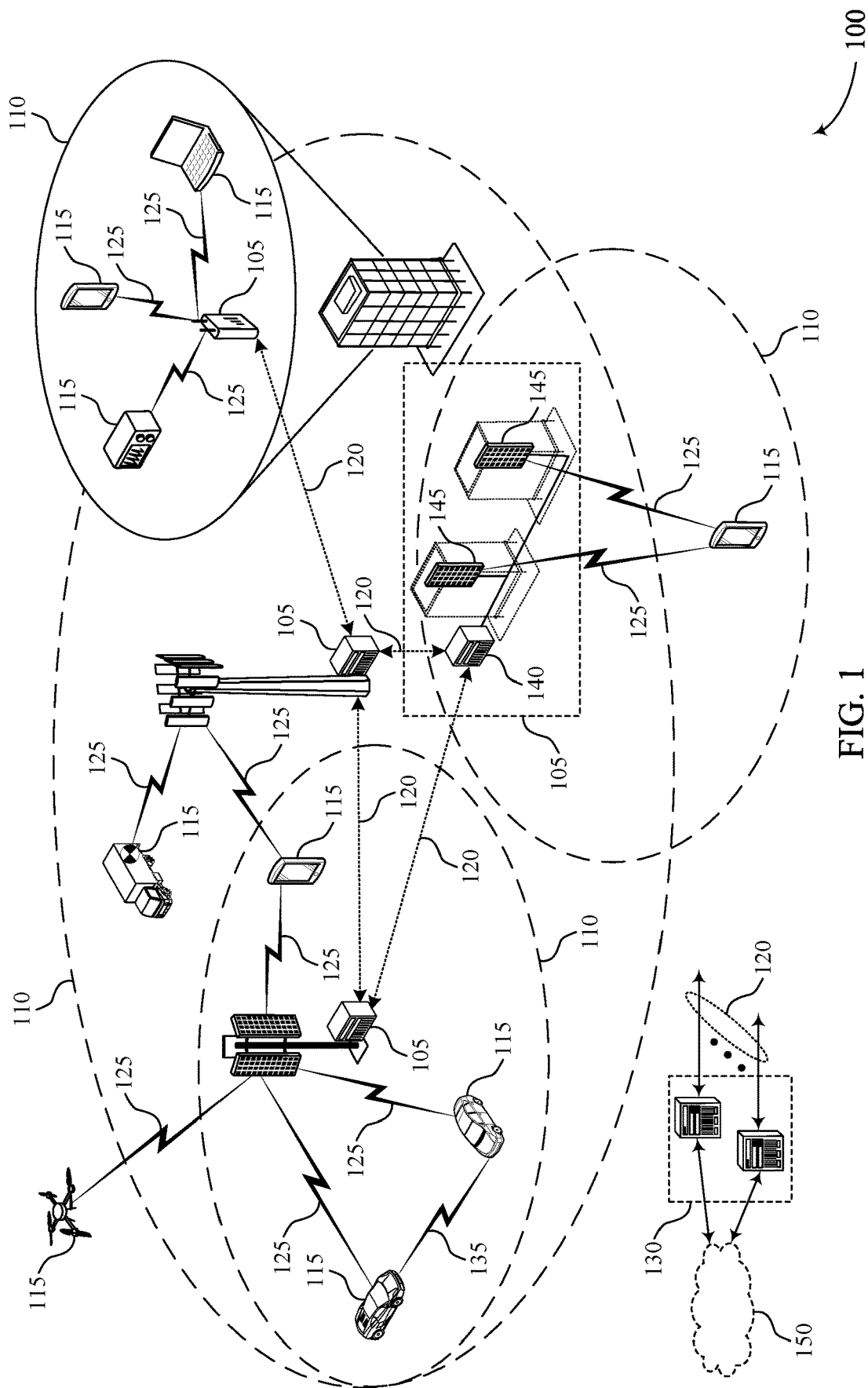
FIG. 1 illustrates an example of a system for wireless communications that supports subband-specific codebook subset restriction in accordance with aspects of the present disclosure.

Some wireless communication systems may include communication devices, such as user equipments (UEs) and base stations, for example, eNodeBs (eNBs), next-generation NodeBs or giga-NodeBs (either of which may be referred to as a gNB) that may support multiple radio access technologies. Examples of radio access technologies include 4G systems such as Long Term Evolution (LTE) systems and fifth generation (5G) systems which may be referred to as New Radio (NR) systems. The communication devices may, in some examples, support one or more of the above example radio access technologies. Channel state information resources may be measured by a UE to estimate channel quality between a base station and UE, where the channel quality may be indicated by measured parameters (e.g., channel quality indicator, precoding matrix indicator, rank indicator, layer one reference signal received power). The UE may transmit a channel state information report to the base station indicating the channel quality information that the base station may use for data transmissions. In one example, a UE may be configured to transmit a channel state information report to a base station to allow the base station to identify suitable configurations for transmitting downlink signals to the UE. In some cases, the channel state information report may include a precoding matrix indicator that identifies a preferred precoding matrix and/or beam selected by the UE for the base station to use to precode downlink transmissions to the UE. The UE may select the preferred precoding matrix from a number of precoding matrices (e.g., configured precoding matrices from a codebook) that may be used by the base station to precode downlink transmissions to the UE. The base station may use this report for scheduling in the future. In some cases, such in the case of a full duplex base station, the techniques for selecting a precoder may however be deficient.

As described herein, a wireless communications system may support efficient techniques for supporting subband-specific codebook subset restrictions. Specifically, the subband-specific codebook subset restrictions may account for the self-interference between uplink communication and downlink communication at a base station (e.g., a base station operating in a full duplex mode). According to one or more aspects of the present disclosure, a UE may receive a first configuration of one or more channel state information reference signal resources and a second configuration of a channel state information report associated with the one or more channel state information reference signal resources. In some cases, the second configuration may include at least one of an indication of a codebook, multiple codebook restriction sets, and a configured bandwidth. The UE may then identify a mapping between one or more frequency-domain subbands of the configured bandwidth and each codebook restriction set of the multiple codebook restriction sets and may transmit a report to the base station. In some cases, the report may indicate one or more precoding matrix indicators from the codebook for each of the one or more frequency-domain subbands based on the mapping.

UEs capable of supporting subband-specific codebook subset restrictions may utilize the techniques described herein to experience power saving, such as reduced power consumption and extended battery life while ensuring reliable and efficient communications between UEs and base stations. Particular aspects of the subject matter described in this disclosure may be implemented to realize one or more of the following potential advantages. The techniques employed by the described UEs may provide benefits and enhancements to the operation of the UEs. For example, operations performed by the UEs may provide improvements to wireless operations. In some examples, the UEs may support high reliability and low latency communications, among other examples, in accordance with aspects of the present disclosure. The described techniques may thus include features for improvements to power consumption, spectral efficiency, higher data rates and, in some examples, may promote enhanced efficiency for high reliability and low latency operations, among other benefits.

Aspects of the disclosure are initially described in the context of wireless communications systems. Aspects of the disclosure are illustrated by and described with reference to configurations and process flows. Aspects of the disclosure are further illustrated by and described with reference to apparatus diagrams, system diagrams, and flowcharts that relate to subband-specific codebook subset restriction.

FIG. 1 illustrates an example of a wireless communications system 100 that supports subband-specific codebook subset restriction in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a subband, a bandwidth part) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more subbands. The base station 105 may transmit a reference signal (e.g., a cell-specific reference signal (CRS), a channel state information reference signal), which may be precoded or unprecoded. The UE 115 may provide feedback for beam selection, which may be a precoding matrix indicator or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A base station 105 may include multiple antenna panels, where one antenna panel may be dedicated for downlink communications and another antenna panel may be dedicated for simultaneous uplink communication (e.g., communicating simultaneously on the uplink and downlink during a particular time period). Simultaneous downlink and uplink transmissions may result in self-interference at a base station 105, at a UE 115, or both. A UE 115 may perform a channel estimation and may report back to a base station 105 a preferred precoder and beam selection based on performing the channel estimation. A base station 105 may determine that the preferred precoder and beam (i.e., the beam selected by the UE) may cause interference (such as self-interference at the UE 115 or at the base station 105) to a concurrent uplink reception at the base station 105. Thus, there exists a need for a to account for self-interference at a base station 105 while selecting and reporting a precoder and/or a beam.

One or more aspects of the present disclosure may provide for a wireless communications system 100 supporting subband-specific codebook subset restrictions to account for the self-interference between uplink communication and downlink communication. A codebook subset restriction may indicate that a subset of precoders (or other values) of a codebook is restricted, such that a UE 115 may be prevented from selecting and reporting a precoder from the restricted subset. The indication may indicate the subset that is restricted or may indicate the subset that remains available for selection (thereby implying the restricted subset). A UE 115 may support multiple codebook restriction sets and may identify a mapping between one or more frequency-domain subbands of a configured bandwidth and each codebook restriction set of the multiple codebook restriction sets. That is, a first codebook subset restriction may be applicable to one or more first frequency subbands, and a second codebook subset restriction may be applicable to one or more second frequency subbands. In some cases, the UE 115 may receive a first configuration of one or more channel state information reference signal resources. The UE 115 may also receive a second configuration of a channel state information report associated with the one or more channel state information reference signal resources, the second configuration including at least one of an indication of a codebook, multiple codebook restriction sets, and a configured bandwidth. The UE 115 may identify a mapping between one or more frequency-domain subbands of the configured bandwidth and each codebook restriction set of the multiple codebook restriction sets, and may transmit a report to the base station 105.

Figure 2:
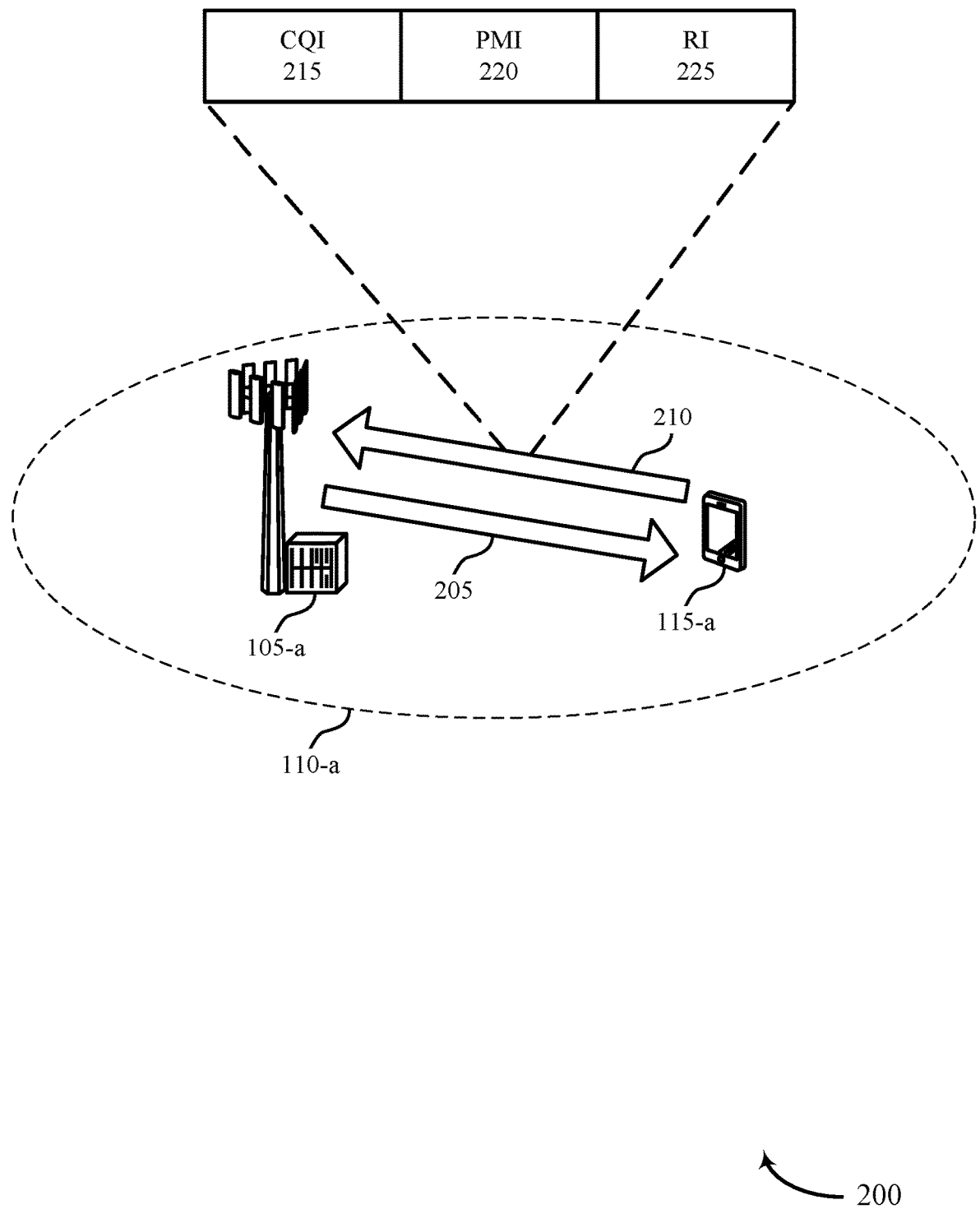
FIG. 2 illustrates an example of a wireless communications system that supports subband-specific codebook subset restriction in accordance with aspects of the present disclosure.

FIG. 2 illustrates an example of a wireless communications system 200 that supports subband-specific codebook subset restriction in accordance with aspects of the present disclosure. In some examples, the wireless communications system 200 may implement aspects of the wireless communications system 100. Wireless communications system 200 includes base station 105-a and UE 115-a, which may be examples of the corresponding devices described with reference to FIG. 1. Base station 105-a may communicate with wireless devices (including UE 115-a) within coverage area 110-a. For example, base station 105-a may transmit downlink signals to UE 115-a on resources of a carrier 205, and UE 115-a may transmit uplink signals to base station 105-a on resources of a carrier 210. In some cases, base station 105-a may communicate with UE 115-a using TDD techniques or FDD techniques. For TDD techniques, base station 105-a may support a certain set of downlink transmission modes (e.g., transmission modes 1, 2, 3, 4, 6, 8, 9, and 10), and, for FDD techniques, base station 105-a may support a different set of downlink transmission modes (e.g., transmission modes 1, 2, 3, 4, 6, 9, and 10).

Wireless communications system 200 may support communication between base station 105-a and UE 115-a using various antenna configurations, as described with reference to wireless communications system 100. Wireless communications system 200 may also implement other aspects of wireless communications system 100. In some cases, the UE 115-a may be configured to report a channel state information to the base station 105-a (e.g., periodically or aperiodically) based on, for example, reference signals received from base station 105-a (e.g., channel state information reference signals). A channel state information report may include a channel quality indicator 215, a precoding matrix indicator 220, and a rank indicator 225.

Some wireless communications systems support subband full duplex communication. In some examples, certain wireless communications systems may support FDD in unpaired spectrum. In some cases, the wireless communications systems may support a baseline and a FDD configuration. For instance, the wireless communications systems may support the FDD within a component carrier bandwidth (e.g., within an uplink bandwidth and a downlink bandwidth). In one example, the component carrier bandwidth may include an uplink bandwidth of 20 MHz and a downlink bandwidth of 80 MHz. In one example, the wireless communications systems may support a guard band between the uplink bandwidth and the downlink bandwidth. Additionally or alternatively, the wireless communications systems may support other partitions of bandwidth which are subject to interference alignment between base stations and operators.

In some cases, a full-duplex base station (such as base station 105-a) may support full-duplex communication using multi panel antennas. In one example of full-duplex communications, a base station may use the same slot or the same frequency division multiplexed symbol to transmit downlink communications on the same component carrier to different UEs. Additionally or alternatively, the base station may use the same slot or the same frequency division multiplexed symbol to receive uplink communications on the same component carrier from one or more UEs.

In some examples, a base station may include multiple antenna panels, where one antenna panel may be dedicated for downlink communications and another antenna panel may be dedicated for uplink communication (e.g., during a particular time period). In some cases, simultaneously using multiple antenna panels for uplink communication and downlink communication may result in self-interference. Some wireless communications systems may not account for the self-interference between uplink communication and downlink communication. In some aspects, a UE may perform a channel estimation and may report back a preferred precoder and beam selection based on performing the channel estimation. A base station receiving the report from the UE may use the preferred precoder in order to maximize a throughput of downlink communications to the UE. In some cases, the selected beam (i.e., the beam selected by the UE) may cause interference (such as self-interference at the UE) to a concurrent uplink reception at the base station. One or more aspects of the present disclosure may provide for subband-specific codebook subset restrictions to account for the self-interference between uplink communication and downlink communication.

In some aspects, self-interference may be experienced by a base station at an edge of a frequency (e.g., a frequency boundary between frequency resources configured for uplink communications and frequency resources configured for downlink communications). A subband-specific codebook subset restriction may provide for the base station to select a different beam for a physical resource block located in the vicinity of uplink traffic. In some examples, wireless communications systems may support subband full duplex in unpaired TDD spectrum. One or more aspects of the present disclosure may provide for reduced self-interference in a full-duplex base station while serving a UE in either a half-duplex mode (either uplink or downlink), or full-duplex mode where it can simultaneously transmit and receive in the TDD band. In some examples, it may be desirable to reduce self-interference, as the interference from downlink to uplink may be significant as the base station may transmit with high power in downlink.

In some example wireless communications systems, a UE may be half-duplex and a base station may be full-duplex with a split panel architecture to support simultaneous transmission and/or reception in subband full-duplex. In such cases, the base station may use both antenna panels in some slots for downlink transmission. Additionally or alternatively, the base station may use half panel in a subband full-duplex slot for downlink transmission. In some examples, the usage of antenna panels may affect downlink beamforming between both slots since the number of ports and/or power are different in each slot. As described herein, according to conventional methods, a UE may choose and suggest a precoder and/or a beam for a base station to use for downlink transmissions. However, using the selected downlink beam in a subband full-duplex may lead to self-interference between downlink transmissions and uplink transmissions (e.g., from another UE or backhaul communications from another base station, etc.). That is, the base station may determine that choosing a different beam instead of the beam indicated by the UE may reduce or avoid the self-interference.

Some wireless communications systems may support multiple codebook types. One or more codebooks (expect a port selection codebook) may be designed based on 1-dimensional (1-D)/2-D-discrete fourier transform vectors. In some cases, the one or more codebooks may implicitly assume that a uniform linear or planar array is employed at the base station. Since wireless communications systems often support a wide variety of 2-D antenna array dimensions, the codebooks may be configurable and scalable. That is, an antenna port layout (of an antenna panel) in vertical and horizontal dimensions (e.g., $N_1$ and $N_2$ respectively) may be explicitly configured as part of the codebook configuration. In one example of a multi-panel codebook, the number of panels $N_g$ may also be configured. In some cases, it may also be implicitly assumed that dual-polarized antenna arrays are used, implying that the total number of channel state information-reference signal antenna ports that are used by the codebook is according to the equation (1):

$$P = 2N_g N_1 N_2 \quad (1)$$

where $N_g=1$ for the single panel and Type II codebooks. In some cases, a base station supporting NR communications may support up to 32 antenna ports for the NR codebooks. Additionally or alternatively, the base station may support various antenna port layouts for the single-panel and Type II codebooks.

In some wireless communications systems, codebooks may be part of channel state information feedback from a UE. For instance, the UE may feedback one or more codebooks based on 1-D/2-D-discrete fourier transform vectors by configuring the UE with an antenna port layout. In one example, the UE may determine a number of antennas at the UE in a first direction and a number of antennas at the UE in a second direction. In some cases, the UE may measure a channel based on the codebook. For example, the UE may determine an antenna panel for transmission to the UE and/or reception at the UE. In some cases, the base station may include multiple antenna panels, and the UE may select a beam that spans across multiple antenna panels. In some cases, the base station may select a beam per antenna panel and may further select a co-phasing factor to phase the beam across multiple antenna panels.

In some examples, a type I single-panel codebook may include discrete fourier transform precoder vectors with linearly increasing phases over the antenna ports in each spatial dimension. Such a codebook design may implicitly assume an antenna setup of phase-calibrated and equally spaced antenna ports in each dimension. In such cases, one or more precoders of the codebook may match an array response assuming a pure line-of-sight channel and may provide a representation of the dominant channel path for other propagation conditions. However, in the case of an uncalibrated multi-panel array (e.g., antenna array) and/or a non-uniform multi-panel array, the implicit assumptions of the discrete fourier transform codebook may be disrupted. In some examples, applying a discrete fourier transform precoder across antenna elements of the multiple panels may not result in an efficient representation of the channel response.

In some cases, a spacing between a last antenna element of an antenna panel and a first antenna element of the next antenna panel may be different from the antenna element spacing within an antenna panel for a non-uniform panel array. Thus, the phase shift between the antenna elements may be according to equation (2) rather than equation (3):

$$e^{\frac{j2\pi k(1+\Delta_{panel})}{N}} \quad (2)$$

$$e^{\frac{j2\pi k}{N}} \quad (3)$$

The phase shift between the antenna elements may be according to equation (2) rather than equation (3) (as it is for the DFT precoder) in order to create a linear phase front, where k is the discrete fourier transform precoder index, N the number of antennas in a dimension and $\Delta_{panel}$ is the additional distance between antenna panels compared to the distance between antenna panels in a uniform multi-panel array. Further, an additional phase offset may exist between antenna panels. In some examples, the additional phase offset may be due to different local oscillator phase states or frequency offsets. Additionally or alternatively, the phase offset may be random and may be uniformly distributed in [0, 2I]. Thus, a different codebook design for such a setup of antenna may be desired.

A codebook design for a multi-panel codebook may be built by applying a precoder $w_{SP}$ from a single-panel codebook on each constituent panel. In some cases, the same single-panel precoder $w_{SP}$ may be applied on each antenna panel of the multi-panel antenna array. Additionally or alternatively, to compensate for a possible calibration error between antenna panels as well as the phase offset due to the non-uniform antenna panel placement, a per-panel co-phasing factor on may be applied to each panel n. In some cases, applying per-panel co-phasing factor on may imply that a precoding vector for a layer may be described as for a multi-panel codebook consisting of $N_g$=4 panels according to the equation (4):

$$w_{MP} = \begin{bmatrix} w_{SP} \\ \varphi_1 w_{SP} \\ \varphi_2 w_{SP} \\ \varphi_3 w_{SP} \end{bmatrix} \quad (4)$$

One or more aspects of the present disclosure may provide for a channel state information report setting to be configured with a codebook subset restriction as well as a rank restriction. The codebook subset restriction may indicate to a UE that some precoders in the codebook are not allowed to be selected for the precoding matrix report. According to some aspects, a UE may support multiple codebook restriction sets and may identify a mapping between one or more frequency-domain subbands of the configured bandwidth and each codebook restriction set of the multiple codebook restriction sets. Configuring codebook subset restriction can be useful in controlling inter-cell interference. For instance, a base station (such as base station 105-a) may be aware of some precoders, which correspond to certain transmission directions. The base station may determine that selecting such precoders may result in a large amount of interference to neighboring cells (or self-interference between a downlink transmission and a simultaneous uplink transmission in the case of a base station operating in a full duplex mode). Using a subband-specific codebook subset restriction may restrict a UE from selecting the precoders associated with certain subbands (e.g., subbands within a threshold distance of an uplink and downlink resource boundary) that may cause interference. That is, one or more aspects of the present disclosure may configure the UE to select different precoders having improved inter-cell interference properties.

In some cases, the UE 115-a may receive a first configuration of one or more channel state information reference signal resources. The UE may also receive a second configuration of a channel state information report associated with the one or more channel state information reference signal resources, the second configuration including at least one of an indication of a codebook, multiple codebook restriction sets, and a configured bandwidth. The UE 115-a may identify a mapping between one or more frequency-domain subbands of the configured bandwidth and each codebook restriction set of the multiple codebook restriction sets, and transmit a report to the base station 105-a. The mapping may indicate which frequency subbands that a particular codebook subset restriction applies to. In one example, the report may indicate one or more precoding matrix indicators from the codebook for each of the one or more frequency-domain subbands based on the mapping. That is, the report may indicate one or more precoding matrix indicators that were selected from the restricted codebooks based on the mapping between the codebook subset restrictions and the subbands. In some instances, for reporting the precoding matrix indicator 220, the UE 115-a may be configured to identify a precoding matrix for base station 105-a to use to precode downlink transmissions to UE 115-a. The UE 115-a may evaluate a subset of the precoding matrices that may be used by base station 105 to precode downlink transmissions to UE 115-a to identify the preferred precoding matrix. The base station 105-a may use Radio Resource Control (RRC) signaling to indicate precoding matrices to the UE 115-a that the UE 115-a should evaluate to identify a preferred precoding matrix (e.g., using techniques for codebook restriction or codebook sub-sampling).

As described herein, the base station 105-a may determine a configuration of a time period for downlink transmissions. For example, the configuration may indicate an uplink portion within the time period (e.g., frequency resources configured for uplink communications) and a downlink portion (e.g., frequency resources configured for downlink communications) within the time period. In some examples, full-duplex time slots may only have downlink time division multiplexed with time slots including uplink. In some examples, full-duplex time slots may have downlink and uplink frequency division multiplexed. In some cases, the base station 105-a may configure the UE 115-a with different precoders in different parts of the time period according to the configuration. In some examples, based on the configuration of the time slot, the base station 105-a may determine to exclude certain precoders (e.g., via a codebook subset restriction) from a frequency band bordering between uplink and downlink (e.g., within a threshold distance of the border between uplink and downlink resources).

According to one or more aspects of the present disclosure, the UE 115-a may be configured with two channel state information report configurations. A first channel state information report configuration may configure the UE 115-a to report with a multi-panel codebook, and a second channel state information report configuration that may configure the UE 115-a to report with a single-panel codebook. That is, in some slots where the UE 115-a is scheduled with both uplink and downlink, the UE 115-a may use the multi-panel codebook. Additionally or alternatively, in some slots where the UE 115-a is scheduled with either uplink or downlink, the UE 115-a may use the single-panel codebook. In some cases, each report configuration may be associated with a channel state information-reference signal resource mapped to the different number of channel state information-reference signal ports. For example, one report may be associated with a 32 port channel state information-reference signal resource and configured with a multi-panel codebook reporting, and another report may be associated with a 16-port channel state information-reference signal resource configured with a single-panel codebook reporting. Each channel state information-reference signal resource may have an individually configured powerOffset value, where a single-panel power may be lower than a multi-panel power.

Base station 105-a may support efficient techniques for dynamically updating and adapting the precoding matrices for UE 115-a to evaluate based on configuration of a time period. In particular, the base station 105-a may support techniques for dynamically indicating, to the UE 115-a, a subband-specific codebook restriction for the UE 115-a to evaluate to identify a preferred precoding matrix. In some aspects, the base station 105-*a* may report a subband-specific codebook restriction for the channel state information report associated with a single-panel codebook. In some examples, the base station 105-*a* and the UE 115-*a* may support configurations of two or more sets of codebook subset restrictions, and the codebook subset restrictions may be applicable to particular subbands of a configured bandwidth (e.g., based on a mapping). In one example, the sets of codebook restrictions can be applied to a one-sided bandwidth (e.g., the configured bandwidth having a single downlink portion and a single uplink portion such that there is only one uplink/downlink border) or a two-sided bandwidth (e.g., the configured bandwidth having two downlink portions on either side of an uplink portion such that there are two uplink/downlink borders).

In some examples, the base station 105-*a* may associate each set of codebook restrictions with a set of physical resource blocks or subbands (e.g., via a mapping). In some examples, the set of physical resource blocks or subbands may or may not be contiguous. For example, the UE 115-*a* may identify an uplink portion within a time period and a downlink portion within the time period. In some cases, one set of codebook restrictions may correspond to physical resource blocks that are within a configured threshold from an uplink portion or uplink bandwidth part in the slots or symbols where full-duplex communication is possible. Upon identifying the uplink portion and the downlink portion, the UE 115-*a* may identify a mapping between a first codebook restriction set and a threshold number of physical resource blocks from the uplink portion within the time period. The UE 115-*a* may also identify a mapping between a second codebook restriction set and a remaining number of physical resource blocks within the time period. In some cases, the base station 105-*a* may indicate the threshold number of physical resource blocks to the UE 115-*a*.

In some cases, if the UE 115-*a* is configured with a full-duplex region, then the UE 115-*a* may identify boundaries of physical resource blocks within a component carrier which are used for uplink while others are used for downlink. In such an example, one set of codebook restrictions may correspond to physical resource blocks next to the boundaries of transition from downlink to uplink and another set of codebook restrictions may correspond to all the remaining physical resource blocks. For instance, the UE 115-*a* may identify, based on a configuration of a time period for downlink transmissions, a first set of physical resource blocks associated with an uplink portion. The UE 115-*a* may then identify, on the configuration of the time period, a second set of physical resource blocks associated with a downlink portion, and determine a boundary between the uplink portion and the downlink portion. As described herein, the UE 115-*a* may identify a mapping between a first codebook restriction set and a subset of the second set of physical resource blocks located within a threshold distance from the boundary between the uplink portion and the downlink portion. The UE 115-*a* may further identify a mapping between a second codebook restriction set and a remaining number of the second set of physical resource blocks within the time period. In some examples, the first set of physical resource blocks and the second set of physical resource blocks may be associated with a component carrier.

Additionally or alternatively, the UE 115-*a* may identify, based on a configuration of a time period for downlink transmissions, a guard band within the time period, and may determine a threshold number of physical resource blocks from the guard band within the time period. The UE 115-*a* may then identify a mapping between a first codebook restriction set and the threshold number of physical resource blocks from the guard band within the time period, and may identify a mapping between a second codebook restriction set and a remaining number of physical resource blocks within the time period.

According to one or more aspects, the base station 105-*a* may configure a subband size with respect to a bandwidth part and may split the downlink bandwidth part into the subbands. The base station 105-*a* may then assign codebook restrictions to each subband. For example, the UE 115-*a* may identify a set of frequency-domain subbands associated with a downlink bandwidth part. Upon identifying the set of frequency-domain subbands, the UE 115-*a* may identify a mapping between a codebook restriction set with each frequency-domain subband of the plurality of frequency-domain subbands. In some cases, the UE 115-*a* may identify a mapping between a first codebook restriction set and a first set of frequency-domain subbands of multiple frequency-domain subbands and may identify a mapping between a second codebook restriction set and a remaining set of frequency-domain subbands of the multiple frequency-domain subbands. In some examples, to reduce overhead, the base station 105-*a* may allow configuring up to two different codebook restrictions and then associate each subband with either one of the two different codebook restrictions by using up to one bit of overhead for each subband. For example, the UE 115-*a* may receive a control message from the base station 105-*a*. Upon receiving the control message, the UE 115-*a* may identify one or more bits included in the control message. The UE 115-*a* may then identify a mapping between the one or more frequency-domain subbands of the configured bandwidth and each codebook restriction set based on identifying the one or more bits.

One or more aspects of the present disclosure may allow for dynamic reconfiguration of the restricted codebook set (instead of semi-static RRC configuration). In one example, the base station 105-*a* may perform dynamic reconfiguration via MAC control element or downlink control information (or some other dynamic configuration signaling). The UE 115-*a* can be configured with a semi-static codebook set for a channel state information report setting, and the UE 115-*a* may then, receive a MAC control element updating the semi-static codebook set. For example, the UE 115-*a* may receive a control message from the base station 105-*a*. Upon receiving the control message, the UE 115-*a* may update the mapping between the one or more frequency-domain subbands of the configured bandwidth and each codebook restriction set. In some cases, the MAC control element may update how the configured codebook restriction sets are mapped to the subbands. For example, the base station 105-*a* may first use RRC to configure in a channel state information report setting, four different types of codebook restriction sets. The base station 105-*a* may then use MAC control element, for each subband or group of subbands, to activate a different set of codebook restrictions. In other words, the subband regions mapped to different codebook restriction sets may be updated and/or activated through MAC control element.

In some examples, a processing time of a channel state information report configuration with multiple codebook subset restrictions may be larger than the processing time for a channel state information report with single subset restriction. Additionally or alternatively, the UE 115-*a* may transmit a UE capability to the base station 105-*a*. For example, the UE 115-*a* may transmit, to the base station 105-*a*, a UE capability message indicating a capability of the UE to support the plurality of codebook restriction sets. In some cases, aspects of the present disclosure may support different UE capabilities and aperiodic channel state information reports.

Figure 3:
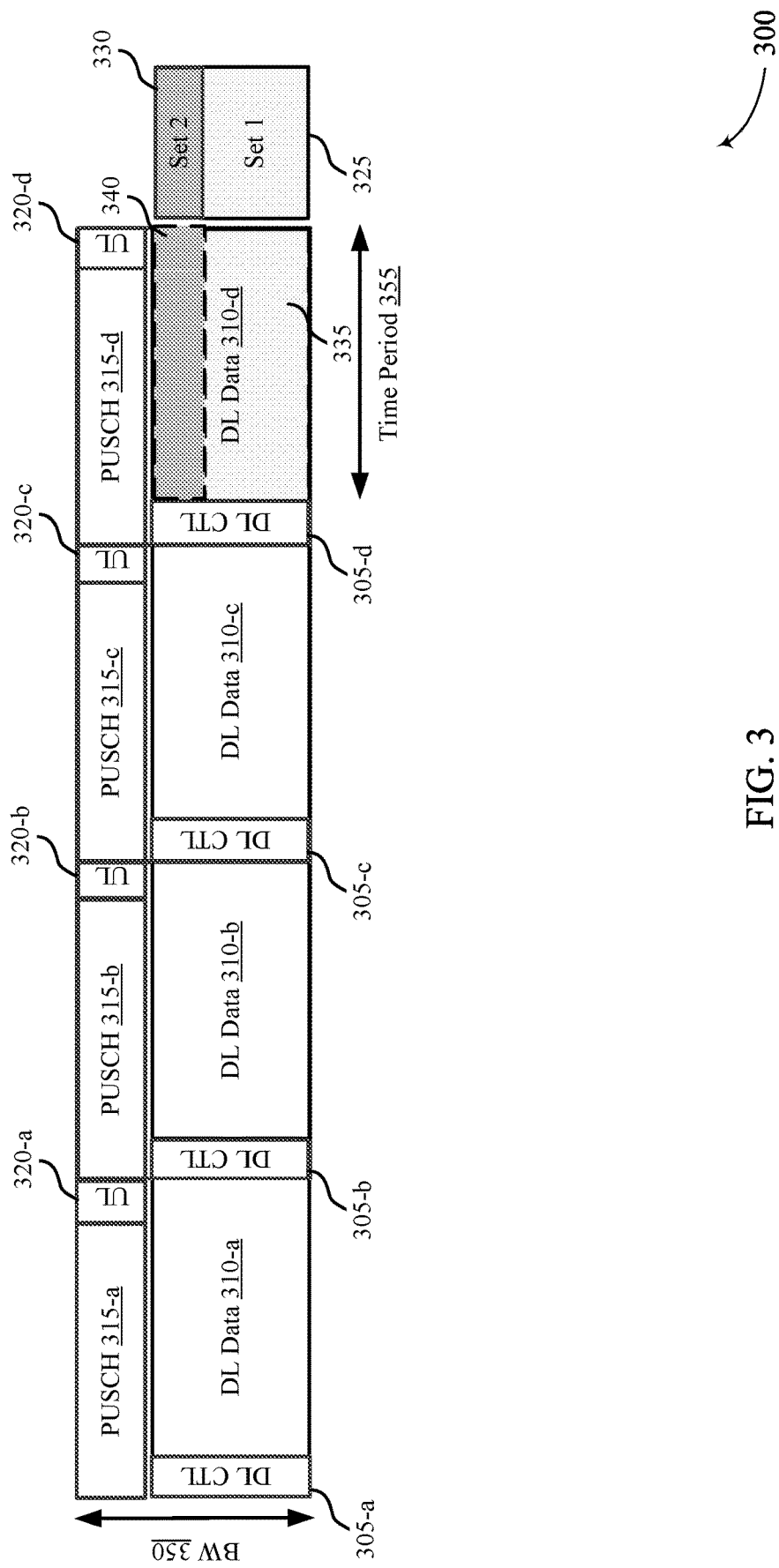
FIG. 3 illustrates an example of a configuration that supports subband-specific codebook subset restriction in accordance with aspects of the present disclosure.

FIG. 3 illustrates an example of a configuration 300 that supports subband-specific codebook subset restriction in accordance with aspects of the present disclosure. In some examples, the configuration 300 may implement aspects of wireless communications system 100 as described with reference to FIG. 1 and the wireless communications system 200 as described with reference to FIG. 2. The configuration 300 may be an example of a configuration supporting full-duplex communications. In the example of FIG. 3, the configuration 300 illustrates procedures for communicating according to a configuration to facilitate subband-specific codebook subset restriction in communication between a UE and a base station, which may be examples of the corresponding devices as described with reference to FIG. 1.

According to one or more aspects of the present disclosure, a UE may receive a first configuration of one or more channel state information reference signal resources. For instance, the UE may receive a resource configuration to use for determining channel quality for a channel shared by the UE and a base station. Additionally or alternatively, the UE may use the first configuration to determine a number of resource elements reserved for channel state information reference signals. The UE may also receive a second configuration of a channel state information report associated with the one or more channel state information reference signal resources, the second configuration including at least one of an indication of a codebook, multiple codebook restriction sets (e.g., Set 1 and Set 2), and a configured bandwidth (e.g., bandwidth 350). In some cases, the UE may identify a configuration of a time period 355. As described herein, the time period 355 may be an example of a time slot, sub-slot, mini-slot, or the like. As depicted in the example of FIG. 3, the configuration 300 may include multiple portions 305 for downlink control (such as 305-a, 305-b, 305-c, and 305-d), multiple portions 310 for downlink data (such as 310-a, 310-b, 310-c, and 310-d), multiple portions 315 of physical uplink shared channel (such as 315-a, 315-b, 315-c, and 315-d), and multiple portions 320 for uplink (such as 320-a, 320-b, 320-c, and 320-d). In some cases, a combination of the multiple portions 315 of physical uplink shared channel and the multiple portions 320 for uplink may include reference signal as well as data for uplink. As described herein, an uplink portion may refer to at least one of one or more portions 315 of the physical uplink shared channel, one or more portions 320 for the uplink, or any combination thereof. In some examples, the UE may identify a mapping between one or more frequency-domain subbands of the configured bandwidth and each codebook restriction set of the multiple codebook restriction sets. The UE may then transmit a report to the base station. For example, the UE may identify a first set of codebook restrictions 325 (e.g., Set 1) and a second set of codebook restrictions 330 (e.g., Set 2). As described in the example of FIG. 3, the UE may identify a mapping between the first set of codebook restrictions 325 (Set 1) and a first set of physical resource blocks. Additionally, the UE may identify a mapping between the second set of codebook restrictions 330 (Set 2) and a second set of physical resource blocks. In some cases, the UE may identify a mapping between a first codebook restriction set and a threshold number of physical resource blocks from the uplink portion within the time period, and may identify a mapping between a second codebook restriction set and a remaining number of physical resource blocks within the time period. The threshold number of physical resource blocks from the uplink portion may be an example of a first subband of the configured bandwidth, and the remaining number of physical resource blocks may be an example of a second subband of the configured bandwidth. As described herein, the remaining number 335 of physical resource blocks may include the first set of physical resource blocks and the threshold number 340 of physical resource blocks may include the second set of physical resource blocks. In some examples, the UE may determine the threshold number of physical resource blocks from a boundary between an uplink portion and a downlink portion. In some cases, the UE may receive an indication of the threshold number of physical resource blocks from a base station.

In the example of FIG. 3, the UE may determine a threshold number 340 of physical resource blocks from a boundary between an uplink portion (e.g., physical uplink shared channel 315-d) and downlink data 310-d. The UE may then identify that the second set of codebook restrictions 330 (e.g., Set 2) maps to the threshold number 340 of physical resource blocks (e.g., a first subband). The UE may additionally identify that the first set of codebook restrictions 325 (e.g., Set 1) maps to a remaining number 335 of physical resource blocks (e.g., a second subband). In this example, the second set of codebook restrictions 330 may restrict certain precoders and/or beams from being selected, that if selected for a downlink transmission within the threshold number 340 of physical resource blocks, may have caused interference based on being close to uplink resources 315-d. However, the first set of codebook restrictions 325 may restrict fewer or different precoders and/or beams from being selected based on the first set of codebook restrictions 325 being mapped to resources that are further from the downlink/uplink border (e.g., at least the threshold number 340 of physical resource blocks away).

Figure 4:
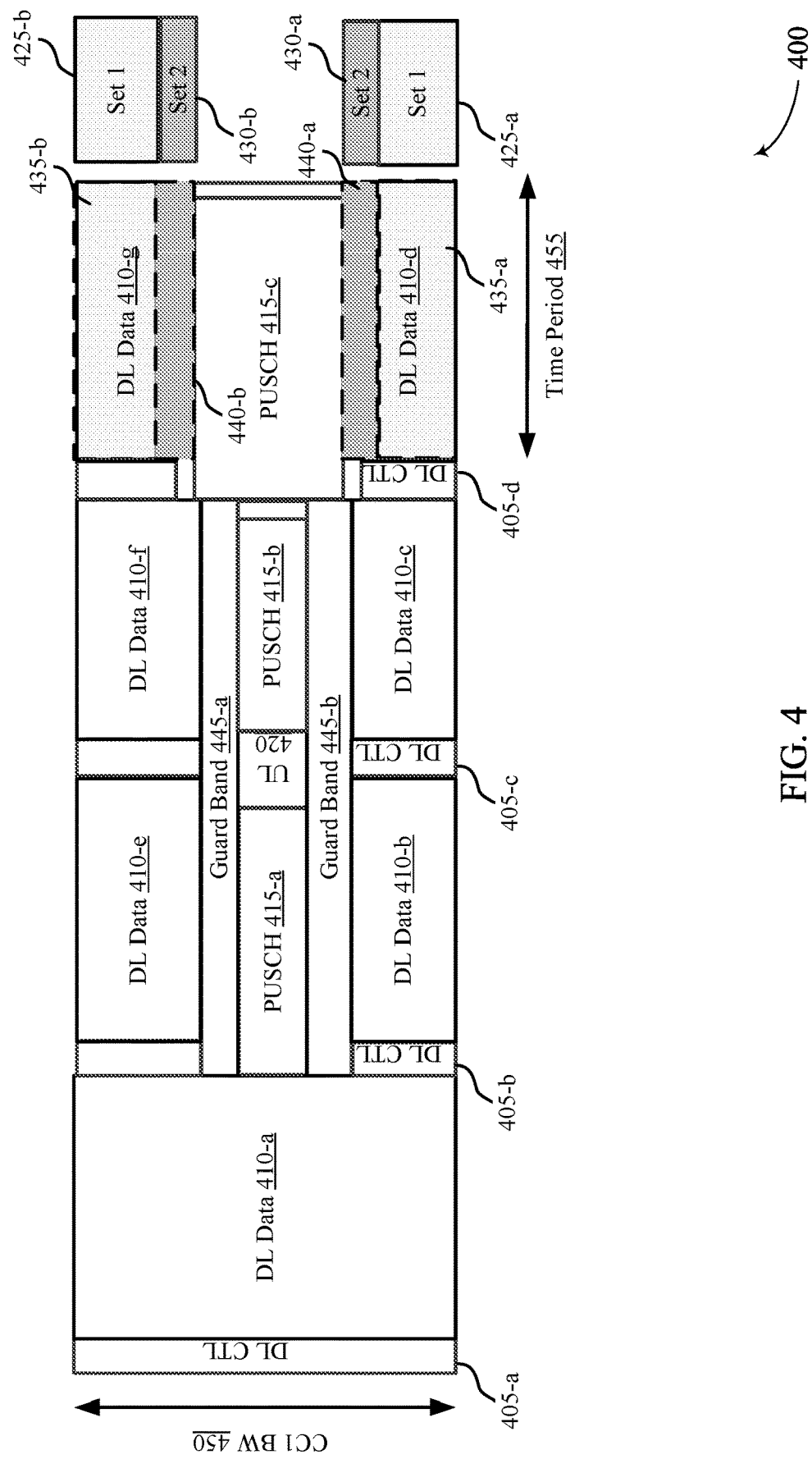
FIG. 4 illustrates an example of a configuration that supports subband-specific codebook subset restriction in accordance with aspects of the present disclosure.

FIG. 4 illustrates an example of a configuration 400 that supports subband-specific codebook subset restriction in accordance with aspects of the present disclosure. In some examples, the configuration 400 may implement aspects of wireless communications system 100 as described with reference to FIG. 1 and the wireless communications system 200 as described with reference to FIG. 2. The configuration 400 may be an example of a configuration of a full-duplex communication within component carrier bandwidth 450. In the example of FIG. 4, the configuration 400 illustrates procedures for communicating according to a configuration to facilitate subband-specific codebook subset restriction.

According to one or more aspects of the present disclosure, a UE may receive a first configuration of one or more channel state information reference signal resources. As described with reference to FIG. 3, the UE may receive configuration of a mapping between a sequence associated with channel state information and one or more resource elements. The UE may then receive a second configuration of a channel state information report associated with the one or more channel state information reference signal resources. In some cases, the second configuration may include at least one of an indication of a codebook, multiple codebook restriction sets (e.g., Set 1 and Set 2), and a configured bandwidth (e.g., component carrier bandwidth 450). In some cases, the UE may identify a configuration of a time period 455 (e.g., time slot, mini slot, sub-slot). As depicted in the example of FIG. 4, the configuration 400 may include multiple portions 405 for downlink control (such as 405-a, 405-b, 405-c, and 405-d), multiple portions 410 for downlink data (such as 410-a, 410-b, 410-c, 410-d, 410-e, 410-f, and 410-g), multiple portions 415 of physical uplink shared channel (such as 415-*a*, 415-*b*, and 415-*c*), a portion 420 for uplink, and multiple portions 445 for guard band (such as 445-*a* and 445-*b*). In some examples, the UE may identify a mapping between one or more frequency-domain subbands of the configured bandwidth and each codebook restriction set of the multiple codebook restriction sets. In the example of FIG. 4, the UE may identify a first set of codebook restrictions 425-*a* and 425-*b* (e.g., Set 1) and a second set of codebook restrictions 430-*a* and 430-*b* (e.g., Set 2). In some cases, a set of codebook restrictions 425-*a* (e.g., Set 1) may map to a first set of physical resource blocks and a set of codebook restrictions 430-*a* (e.g., Set 2) may map to a second set of physical resource blocks. The UE may identify a mapping between one or more frequency-domain subbands of the configured bandwidth 450 and one or more codebook restriction sets.

Additionally or alternatively, the UE may determine a boundary between an uplink portion and a downlink portion. For example, the UE may determine a boundary between the physical uplink shared channel 415-*c* and the downlink data 410-*d*. In some cases, the uplink portion may include a control portion and/or a data portion and the downlink portion may include a control portion (e.g., downlink control 405) and/or a data portion. In the example of FIG. 4, the UE may determine a number 440-*a* of physical resource blocks from a boundary between an uplink portion (e.g., physical uplink shared channel 415-*c*) and downlink data 410-*d*. Additionally, the UE may determine a number 440-*b* of physical resource blocks from a boundary between an uplink portion (e.g., physical uplink shared channel 415-*c*) and downlink data 410-*g*. The UE may then identify that the second set of codebook restrictions 430-*a* (e.g., Set 2) maps to the number 440-*a* of physical resource blocks and that the second set of codebook restrictions 430-*b* (e.g., Set 2) maps to the number 440-*b* of physical resource blocks. The UE may also identify that the first set of codebook restrictions 425-*a* (e.g., Set 1) maps to a remaining number 435-*a* of physical resource blocks within the downlink data 410-*d* and that the first set of codebook restrictions 425-*b* (e.g., Set 1) maps to a remaining number 435-*b* of physical resource blocks within the downlink data 410-*g*. In the example of FIG. 4, the base station may restrict certain precoders to be selected by the UE for a number of physical resource blocks located within a threshold distance from the boundary. For example, the base station may identify that one or more precoders may cause a higher self-interference for the base station to encode physical resource blocks located within a threshold distance from a boundary between an uplink portion and a downlink portion. Accordingly, the base station may restrict the one or more precoders from being selected by the UE. In other words, the base station may restrict the one or more precoders to be included in the second set of codebook restrictions 430-*a* and 430-*b* (e.g., Set 2). Additionally or alternatively, the first set of codebook restrictions 425-*a* and 425-*b* (e.g., Set 1) may restrict fewer or different precoders and/or beams from being selected based on the first set of codebook restrictions 425-*a* and 425-*b* being mapped to physical resource blocks (or subbands) located farther away from the boundary. The UE may then transmit, to the base station, a report indicating one or more precoding matrix indicators from the codebook for each of the one or more frequency-domain subbands based on the mapping.

Figure 5:
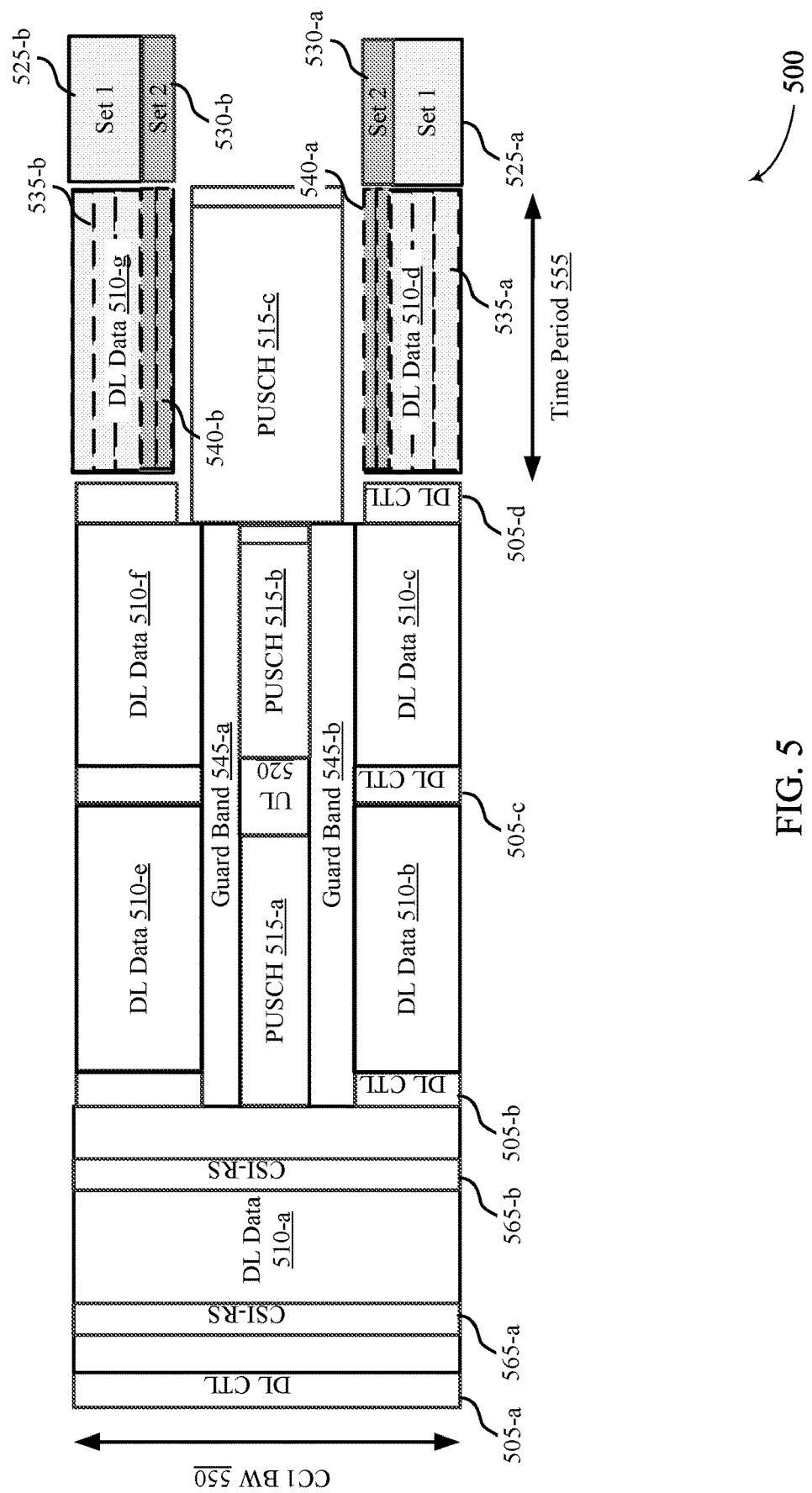
FIG. 5 illustrates an example of a configuration that supports subband-specific codebook subset restriction in accordance with aspects of the present disclosure.

FIG. 5 illustrates an example of a configuration 500 that supports subband-specific codebook subset restriction in accordance with aspects of the present disclosure. In some examples, the configuration 500 may implement aspects of wireless communications system 100 as described with reference to FIG. 1 and the wireless communications system 200 as described with reference to FIG. 2. The configuration 500 may be an example of a configuration of a full-duplex communication within component carrier bandwidth 550. In the example of FIG. 5, the configuration 500 illustrates procedures for communicating according to a configuration to facilitate subband-specific codebook subset restriction.

As described herein, a UE may receive a configuration of one or more channel state information reference signal resources and a configuration of a channel state information report associated with the one or more channel state information reference signal resources. In some examples, the second configuration including at least one of an indication of a codebook, multiple codebook restriction sets (e.g., Set 1 and Set 2), and a configured bandwidth (e.g., component carrier bandwidth 550). In some cases, the UE may identify a configuration of a time period 555 (e.g., time slot, mini slot, sub-slot. As depicted in the example of FIG. 5, the configuration 500 may include multiple portions 505 for downlink control (such as 505-*a*, 505-*b*, 505-*c*, and 505-*d*), multiple portions 510 for downlink data (such as 510-*a*, 510-*b*, 510-*c*, 510-*d*, 510-*e*, 510-*f*, and 510-*g*), multiple portions 515 of physical uplink shared channel (such as 515-*a*, 515-*b*, and 515-*c*), a portion 520 for uplink, multiple portions 545 for guard band (such as 545-*a* and 545-*b*), and multiple portions 565 for channel state information reference signals (such as 565-*a* and 565-*b*). In some examples, the UE may identify a mapping between one or more frequency-domain subbands of the configured bandwidth and each codebook restriction set of the multiple codebook restriction sets. As depicted herein, the UE may receive an indication of the mapping from a base station. For example, the base station may semi-statically or dynamically indicate the mapping and/or one or more rules for the mapping to the UE. Additionally or alternatively, the UE may be preconfigured with one or more rules to determine the mapping. For instance, the UE may be preconfigured with the codebook restriction sets and the UE may apply a codebook restriction set while evaluating one or more precoders for a channel state information report.

In the example of FIG. 5, the UE may identify a first set of codebook restrictions 525-*a* and 525-*b* (e.g., Set 1) and a second set of codebook restrictions 530-*a* and 530-*b* (e.g., Set 2). In some cases, a set of codebook restrictions 525-*a* (e.g., Set 1) may map to a first set of physical resource blocks and a set of codebook restrictions 530-*a* (e.g., Set 2) may map to a second set of physical resource blocks. In one example, the UE may determine a boundary between an uplink portion of the time period 555 and a downlink portion of the time period 555. For instance, the UE may determine a boundary between the physical uplink shared channel 515-*c* and the downlink data 510-*d*. Additionally or alternatively, the UE may determine a boundary between the physical uplink shared channel 515-*c* and the downlink data 510-*g*. In some cases, the uplink portion may include a control portion and/or a data portion and the downlink portion may include a control portion and/or a data portion.

Additionally or alternatively, the UE may determine a number 540-*a* of physical resource blocks from the boundary between an uplink portion (e.g., physical uplink shared channel 515-*c*) and downlink data 510-*d*, and a number 540-*b* of physical resource blocks from the boundary between an uplink portion (e.g., physical uplink shared channel 515-*c*) and downlink data 510-*g*. In some cases, the number 540-*a* of physical resource blocks may include multiple sub-portions and the number 540-*b* of physical resource blocks may include multiple sub-portions. That is, a subband including the number 540-*a* of physical resource blocks may be further divided into multiple subbands and the subband including the number 540-*b* of physical resource blocks may be further divided into multiple subbands. In some examples, the UE may identify a different codebook restriction for each of the multiple subbands (not shown). In some cases, the base station may indicate a codebook restriction for each subband using a bit. In some examples, the base station may use a string of bits to indicate the codebook restriction set associated with each subband. As discussed with reference to FIG. 4, the UE may identify that the second set of codebook restrictions 530-*a* (e.g., Set 2) maps to the number 540-*a* of physical resource blocks and that the second set of codebook restrictions 530-*b* (e.g., Set 2) maps to the number 540-*b* of physical resource blocks. The UE may also identify that the first set of codebook restrictions 525-*a* (e.g., Set 1) maps to a remaining number 535-*a* of physical resource blocks within the downlink data 510-*d* and that the first set of codebook restrictions 525-*b* (e.g., Set 1) maps to a remaining number 535-*b* of physical resource blocks within the downlink data 510-*g*.

According to one or more aspects of the present disclosure, the base station may use a bit "0" to indicate the first set of codebook restrictions 525-*a* and 525-*b* (e.g., Set 1) and a bit "1" to indicate the second set of codebook restrictions 530-*a* and 535-*b* (e.g., Set 2). In the example of FIG. 5, the UE may receive and/or identify a string of bits "1, 1, 0, 0, 0" for activating codebook restriction sets for the downlink data 510-*d* (i.e., the downlink data 510-*d* starting from the boundary). That is, the UE may identify that the two subbands included in the number 540-*a* of physical resource blocks are mapped to the second set of codebook restrictions 530-*a* (e.g., Set 2) and the remaining three subbands included in the number 535-*a* of physical resource blocks are mapped to the first set of codebook restrictions 525-*a* (e.g., Set 1). Similarly, the UE may receive and/or identify a string of bits "1, 1, 0, 0, 0" for activating codebook restriction sets for the downlink data 510-*g* (i.e., the downlink data 510-*g* starting from the boundary). In some examples, the UE may identify that the two subbands included in the number 540-*b* of physical resource blocks are mapped to the second set of codebook restrictions 530-*b* (e.g., Set 2) and the remaining three subbands included in the number 535-*b* of physical resource blocks are mapped to the first set of codebook restrictions 525-*b* (e.g., Set 1). Accordingly, the UE may refrain from selecting certain precoders and/or beams for the multiple subbands included in a number of physical resource blocks (e.g., 540-*a* and 540-*b*) located within a threshold distance from the boundary. The UE may then transmit, to the base station, a report indicating one or more precoding matrix indicators from the codebook for each of the one or more frequency-domain subbands based on the mapping.

Figure 6:
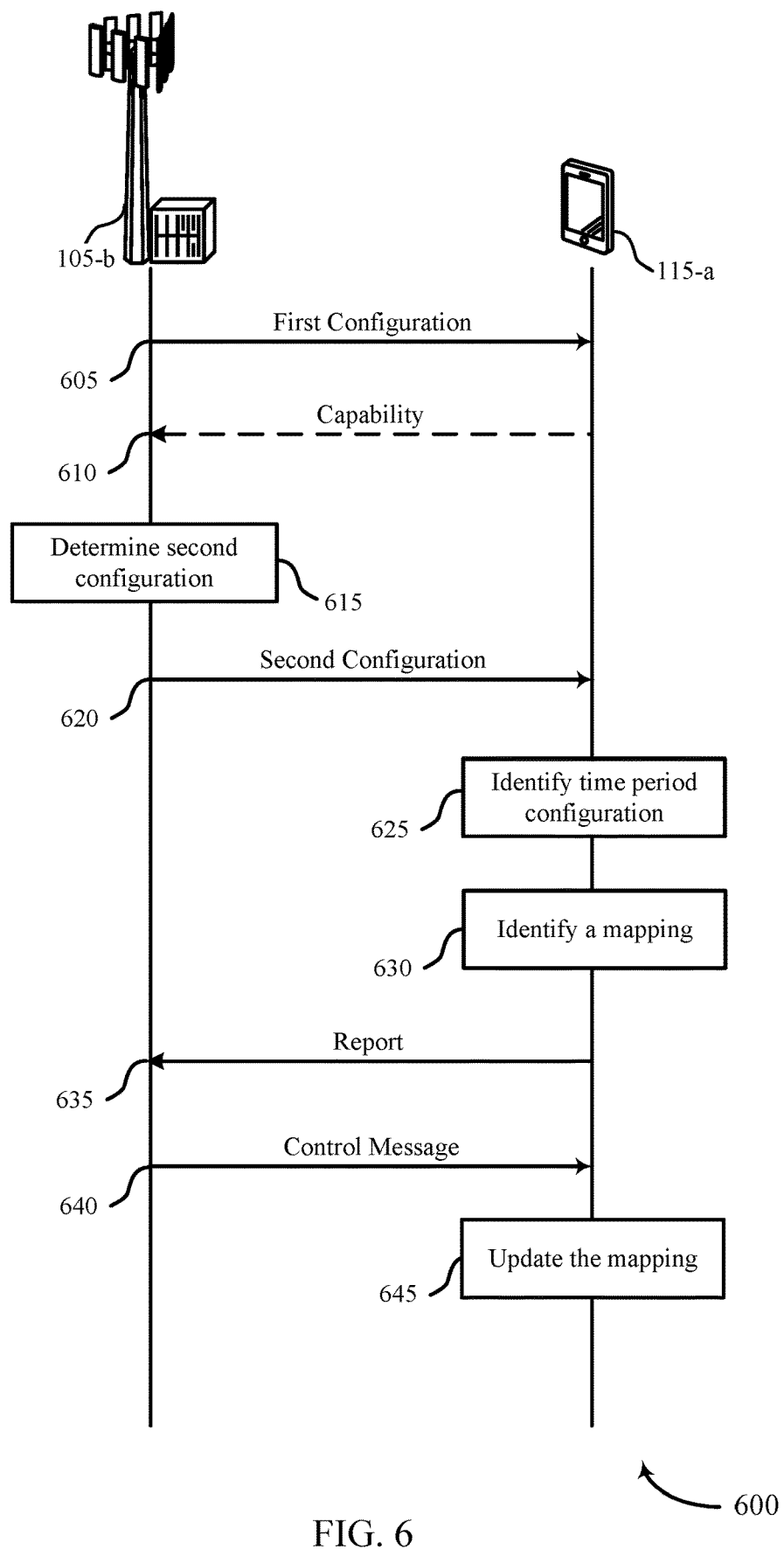
FIG. 6 illustrates an example of a process flow that supports subband-specific codebook subset restriction in accordance with aspects of the present disclosure.

FIG. 6 illustrates an example of process flow 600 that supports subband-specific codebook subset restriction in accordance with aspects of the present disclosure. In some examples, the process flow 600 may implement aspects of the wireless communications system 100 and 200 described with reference to FIGS. 1 and 2, respectively. For example, the process flow 600 may be based on one or more rules for mapping between one or more frequency-domain subbands of the configured bandwidth and each codebook restriction set of a set of codebook restriction sets. In some cases, process flow 600 may be based on a UE receiving (semi-statically or dynamically) an indication of the mapping from a base station. Additionally or alternatively, the UE may be preconfigured with one or more rules to determine the mapping between one or more frequency-domain subbands of the configured bandwidth and each codebook restriction set. The process flow 600 may be implemented by the UE 115-*b* and the base station 105-*b* for reduced power consumption, and may promote low latency and low interference for wireless communications supporting high priority channels, among other benefits. The base station 105-*b* and the UE 115-*b* may be examples of a base station 105 and a UE 115, as described with reference to FIGS. 1 and 2.

In the following description of the process flow 600, the operations between the base station 105-*b* and the UE 115-*b* may be transmitted in a different order than the example order shown, or the operations performed by the base station 105-*b* and the UE 115-*b* may be performed in different orders or at different times. Some operations may also be omitted from the process flow 600, and other operations may be added to the process flow 600.

At 605, the base station 105-*b* may transmit a first configuration of one or more channel state information reference signal resources. At 610, the UE 115-*b* may optionally transmit a UE capability message indicating a capability of the UE to support a set of codebook restriction sets (e.g., multiple codebook restriction sets).

At 615, the base station 105-*b* may determine a second configuration of a channel state information report. In some cases, the base station 105-*b* may determine the second configuration based on the UE capability message. At 620, the base station 105-*b* may transmit the second configuration of a channel state information report associated with the one or more channel state information reference signal resources. In some cases, the second configuration may include at least one of an indication of a codebook, a set of codebook restriction sets, and a configured bandwidth. In some examples, the set of codebook restriction sets are associated with at least one of a single panel codebook, a multi-panel codebook, or a combination thereof.

At 625, the UE 115-*b* may identify a configuration of the time period. In one example, the UE 115-*b* may identify, based on the configuration of a time period for downlink transmissions, an uplink portion within the time period and a downlink portion within the time period. In some cases, the uplink portion may include an uplink bandwidth part and the downlink portion may include a downlink bandwidth part. In some cases, the uplink portion and the downlink portion are concurrently included in the same component carrier and the same symbol.

In one example, the UE 115-*b* may identify, based on the configuration of the time period for downlink transmissions, a first set of physical resource blocks associated with an uplink portion and a second set of physical resource blocks associated with a downlink portion. The UE 115-*b* may then determine a boundary between the uplink portion and the downlink portion. The first set of physical resource blocks and the second set of physical resource blocks may be associated with a component carrier.

Additionally or alternatively, the UE 115-*b* may identify, based on the configuration of the time period for downlink transmissions, a guard band within the time period. The UE 115-*b* may also determine a threshold number of physical resource blocks from the guard band within the time period. The threshold number of physical resource blocks from the guard band may be signaled to the UE 115-*b* (e.g., via control signaling) or may be statically configured.

At 630, the UE 115-*b* may identify a mapping between one or more frequency-domain subbands of the configured bandwidth and each codebook restriction set of the set of codebook restriction sets. In some cases, the one or more frequency-domain subbands of the configured bandwidth may be contiguous. In some cases, the one or more frequency-domain subbands of the configured bandwidth may be non-contiguous.

In some examples, the UE 115-b may identify the mapping between a first codebook restriction set and a threshold number of physical resource blocks from the uplink portion within the time period. Additionally or alternatively, the UE 115-b may identify the mapping between a second codebook restriction set and a remaining number of physical resource blocks within the time period. In some cases, the UE 115-b may receive, from the base station 105-b, a signal indicating the threshold number of physical resource blocks.

In some examples, the UE 115-b may identify the mapping between a first codebook restriction set and a subset of the second set of physical resource blocks located within a threshold distance from the boundary between the uplink portion and the downlink portion. In some examples, the UE 115-b may identify the mapping between a second codebook restriction set and a remaining number of the second set of physical resource blocks within the time period.

In some cases, the UE 115-b may identify the mapping between a first codebook restriction set and the threshold number of physical resource blocks from the guard band within the time period. The UE 115-b may also identify the mapping between a second codebook restriction set and a remaining number of physical resource blocks within the time period.

At 635, the UE 115-b may transmit, to the base station 105-b, a report indicating one or more precoding matrix indicators from the codebook for each of the one or more frequency-domain subbands based on the mapping. In some examples, the report is associated with full-duplex communication.

At 640, the base station 105-b may transmit a control message to the UE 115-b. At 645, the UE 115-b may update the mapping between the one or more frequency-domain subbands of the configured bandwidth and each codebook restriction set based on the control message.

Figure 7:
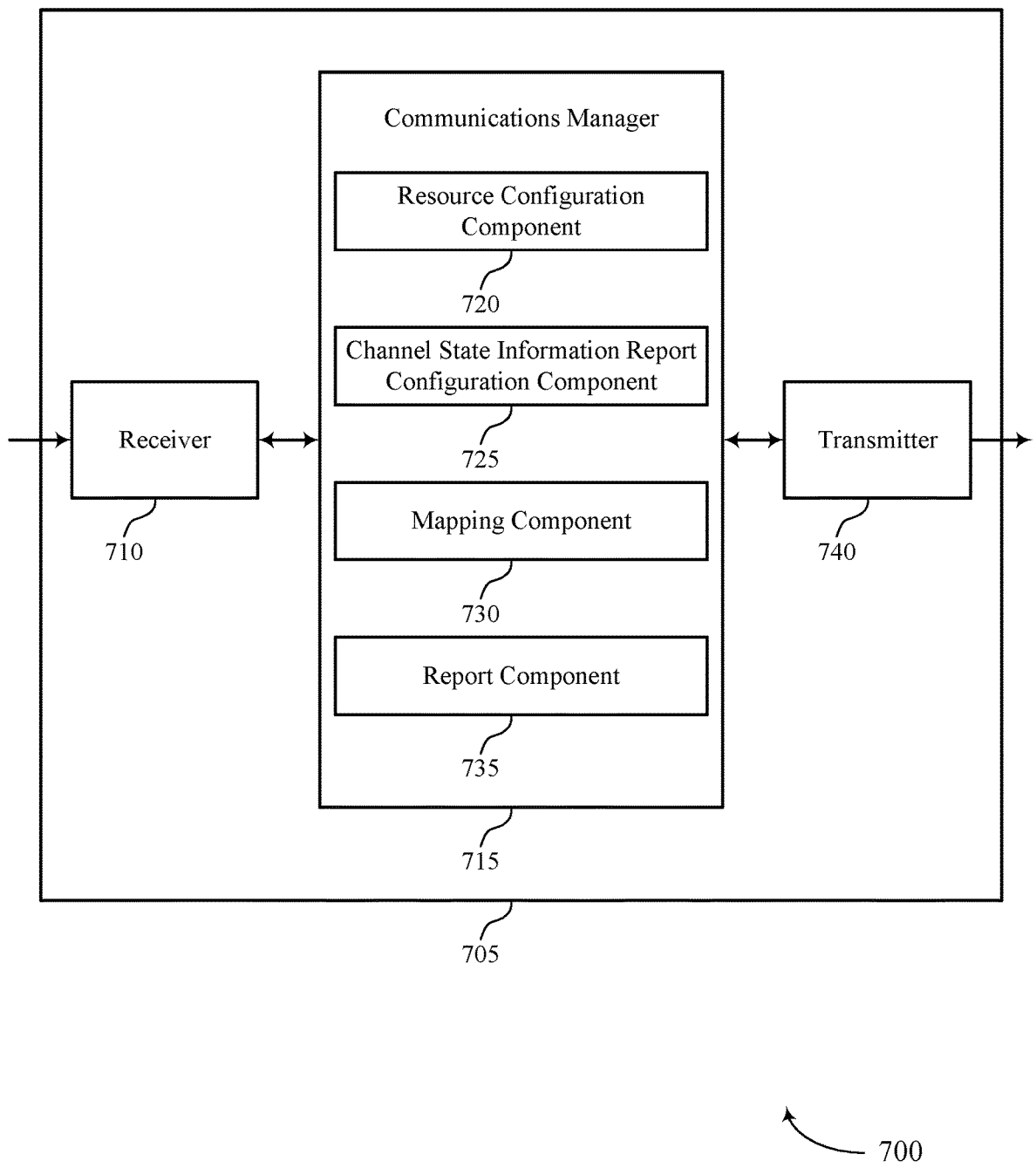
FIGS. 7 and 8 show block diagrams of devices that support subband-specific codebook subset restriction in accordance with aspects of the present disclosure.

FIG. 7 shows a block diagram 700 of a device 705 that supports subband-specific codebook subset restriction in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to subband-specific codebook subset restriction, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a first configuration of one or more channel state information reference signal resources, receive a second configuration of a channel state information report associated with the one or more channel state information reference signal resources, the second configuration including at least one of an indication of a codebook, a set of codebook restriction sets, and a configured bandwidth, identify a mapping between one or more frequency-domain subbands of the configured bandwidth and each codebook restriction set of the set of codebook restriction sets, and transmit, to the base station, a report indicating one or more precoding matrix indicators from the codebook for each of the one or more frequency-domain subbands based on the mapping. The communications manager 715 may be an example of aspects of the communications manager 1010 described herein.

The communications manager 715, or its sub-components, may be implemented in hardware, code (e.g., software or firmware) executed by a processor, or any combination thereof. If implemented in code executed by a processor, the functions of the communications manager 715, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
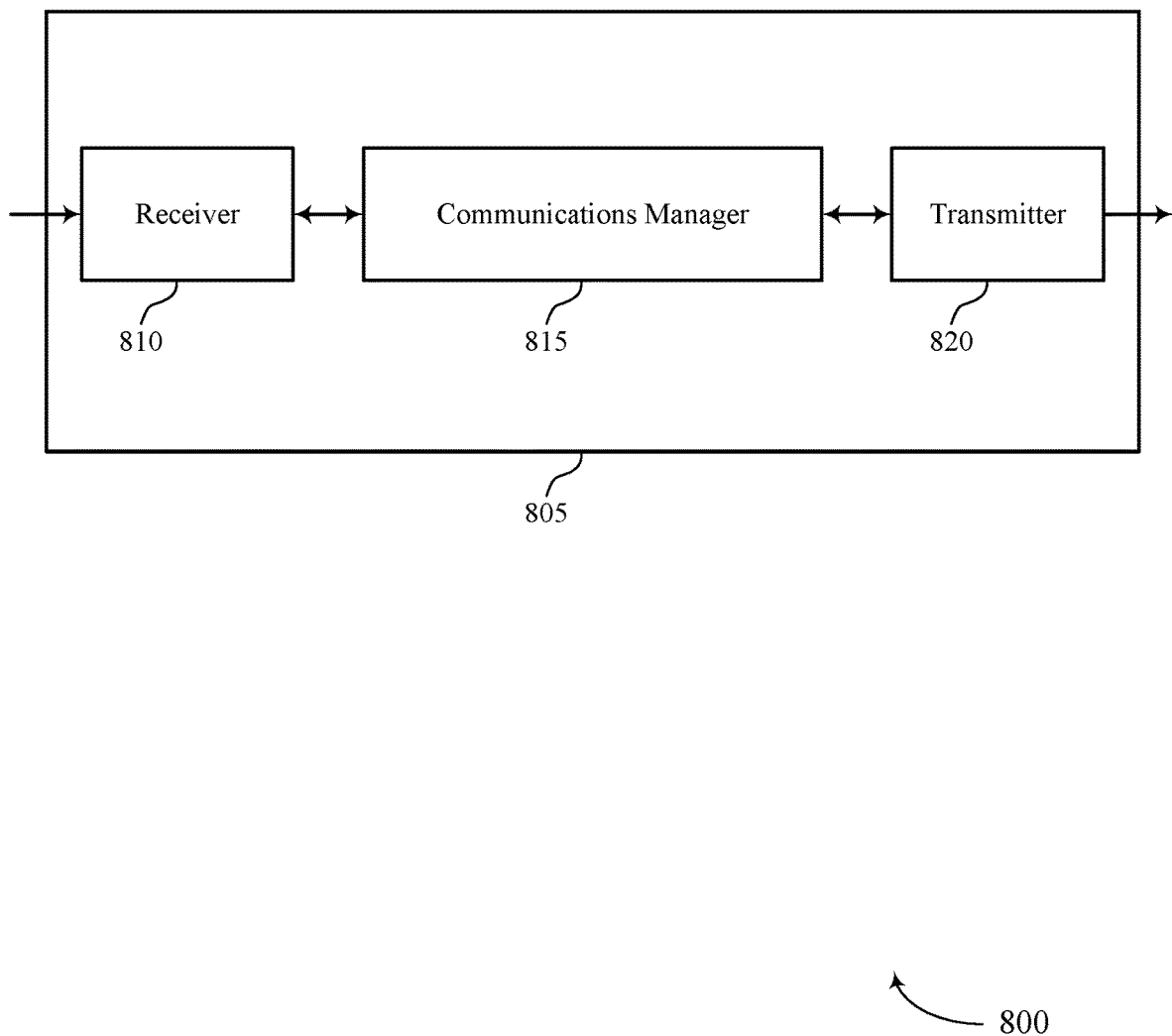

FIG. 8 shows a block diagram 800 of a device 805 that supports subband-specific codebook subset restriction in accordance with aspects of the present disclosure. The device 805 may be an example of aspects of a device 705, or a UE 115 as described herein. The device 805 may include a receiver 810, a communications manager 815, and a transmitter 840. The device 805 may also include a processor. Each of these components may be in communication with one another (e.g., via one or more buses).

The receiver 810 may receive information such as packets, user data, or control information associated with various information channels (e.g., control channels, data channels, and information related to subband-specific codebook subset restriction, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a resource configuration component 820, a channel state information report configuration component 825, a mapping component 830, and a report component 835. The communications manager 815 may be an example of aspects of the communications manager 1010 described herein.

The resource configuration component 820 may receive a first configuration of one or more channel state information reference signal resources. The channel state information report configuration component 825 may receive a second configuration of a channel state information report associated with the one or more channel state information reference signal resources, the second configuration including at least one of an indication of a codebook, a set of codebook restriction sets, and a configured bandwidth.

The mapping component 830 may identify a mapping between one or more frequency-domain subbands of the configured bandwidth and each codebook restriction set of the set of codebook restriction sets. The report component 835 may transmit, to the base station, a report indicating one or more precoding matrix indicators from the codebook for each of the one or more frequency-domain subbands based on the mapping.

The transmitter 840 may transmit signals generated by other components of the device 805. In some examples, the transmitter 840 may be collocated with a receiver 810 in a transceiver module. For example, the transmitter 840 may be an example of aspects of the transceiver 1020 described with reference to FIG. 10. The transmitter 840 may utilize a single antenna or a set of antennas.

Figure 9:
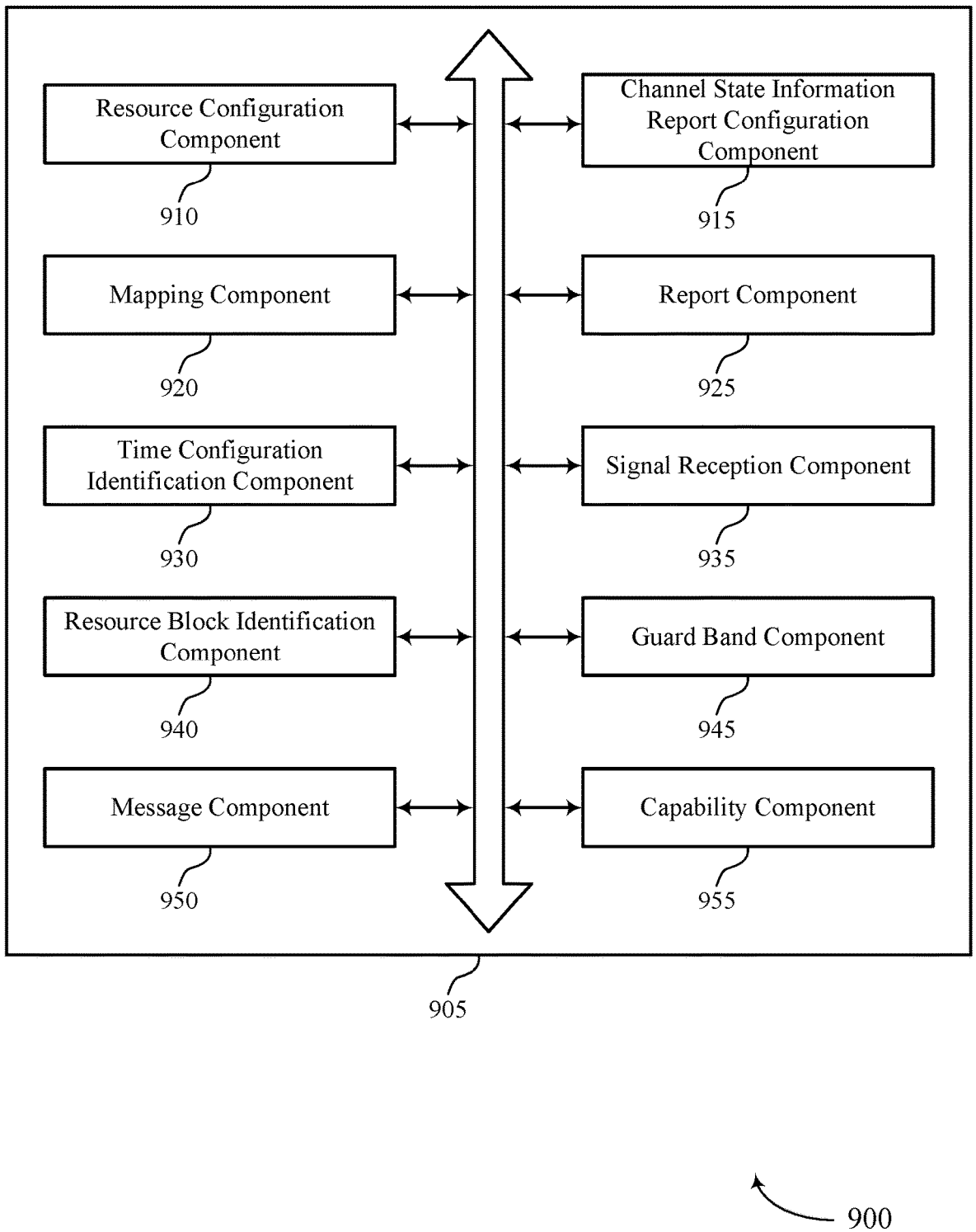
FIG. 9 shows a block diagram of a communications manager that supports subband-specific codebook subset restriction in accordance with aspects of the present disclosure.

FIG. 9 shows a block diagram 900 of a communications manager 905 that supports subband-specific codebook subset restriction in accordance with aspects of the present disclosure. The communications manager 905 may be an example of aspects of a communications manager 715, a communications manager 815, or a communications manager 1010 described herein. The communications manager 905 may include a resource configuration component 910, a channel state information report configuration component 915, a mapping component 920, a report component 925, a time configuration identification component 930, a signal reception component 935, a resource block identification component 940, a guard band component 945, a message component 950, and a capability component 955. Each of these modules may communicate, directly or indirectly, with one another (e.g., via one or more buses).

The resource configuration component 910 may receive a first configuration of one or more channel state information reference signal resources. The channel state information report configuration component 915 may receive a second configuration of a channel state information report associated with the one or more channel state information reference signal resources, the second configuration including at least one of an indication of a codebook, a set of codebook restriction sets, and a configured bandwidth.

The mapping component 920 may identify a mapping between one or more frequency-domain subbands of the configured bandwidth and each codebook restriction set of the set of codebook restriction sets. In some cases, the one or more frequency-domain subbands of the configured bandwidth are contiguous. In some cases, the one or more frequency-domain subbands of the configured bandwidth are non-contiguous.

The report component 925 may transmit, to the base station, a report indicating one or more precoding matrix indicators from the codebook for each of the one or more frequency-domain subbands based on the mapping. In some cases, the report is associated with full-duplex communication.

The time configuration identification component 930 may identify, based on a configuration of a time period for downlink transmissions, an uplink portion within the time period and a downlink portion within the time period, where the mapping is based on the uplink portion and the downlink portion.

In some examples, the mapping component 920 may identify the mapping between a first codebook restriction set and a threshold number of physical resource blocks from the uplink portion within the time period. In some examples, the mapping component 920 may identify the mapping between a second codebook restriction set and a remaining number of physical resource blocks within the time period.

The signal reception component 935 may receive, from the base station, a signal indicating the threshold number of physical resource blocks. In some cases, the uplink portion includes an uplink bandwidth part and the downlink portion includes a downlink bandwidth part. In some cases, the uplink portion and the downlink portion are concurrently included in the same component carrier and the same symbol.

The resource block identification component 940 may identify, based on a configuration of a time period for downlink transmissions, a first set of physical resource blocks associated with an uplink portion. In some examples, the resource block identification component 940 may identify, based on the configuration of the time period, a second set of physical resource blocks associated with a downlink portion.

In some examples, the resource block identification component 940 may determine a boundary between the uplink portion and the downlink portion, where the mapping is based on the boundary. In some cases, the first set of physical resource blocks and the second set of physical resource blocks are associated with a component carrier.

In some examples, the mapping component 920 may identify the mapping between a first codebook restriction set and a subset of the second set of physical resource blocks located within a threshold distance from the boundary between the uplink portion and the downlink portion. In some examples, the mapping component 920 may identify the mapping between a second codebook restriction set and a remaining number of the second set of physical resource blocks within the time period.

The guard band component 945 may identify, based on a configuration of a time period for downlink transmissions, a guard band within the time period. In some examples, the guard band component 945 may determine a threshold number of physical resource blocks from the guard band within the time period, where identifying the mapping is based on the identifying the guard band.

In some examples, the mapping component 920 may identify the mapping between a first codebook restriction set and the threshold number of physical resource blocks from the guard band within the time period. In some examples, the mapping component 920 may identify a set of frequency-domain subbands associated with a downlink bandwidth part, where identifying the mapping is based on identifying the set of frequency-domain subbands. In some cases, the set of codebook restriction sets are associated with at least one of a single panel codebook, a multi-panel codebook, or a combination thereof.

In some examples, the mapping component 920 may identify the mapping between a codebook restriction set with each frequency-domain subband of the set of frequency-domain subbands based on identifying the set of frequency-domain subbands. In some examples, the mapping component 920 may identify the mapping between a first codebook restriction set and a first set of frequency-domain subbands of the set of frequency-domain subbands.

In some examples, the mapping component 920 may identify the mapping between a second codebook restriction set and a remaining set of frequency-domain subbands of the set of frequency-domain subbands.

The message component 950 may receive a control message from the base station. In some cases, the control message includes at least one of downlink control information, a MAC control element, or a combination thereof. In some examples, the mapping component 920 may update the mapping between the one or more frequency-domain subbands of the configured bandwidth and each codebook restriction set based on the control message. In some examples, the channel state information report configuration component 915 may identify the set of codebook restriction sets associated with the codebook based on the control message.

In some examples, the message component 950 may identify one or more bits included in the control message. In some examples, the mapping component 920 may identify the mapping between the one or more frequency-domain subbands of the configured bandwidth and each codebook restriction set based on identifying the one or more bits. The capability component 955 may transmit, to the base station, a UE capability message indicating a capability of the UE to support the set of codebook restriction sets, where the mapping is based on the UE capability message.

Figure 10:
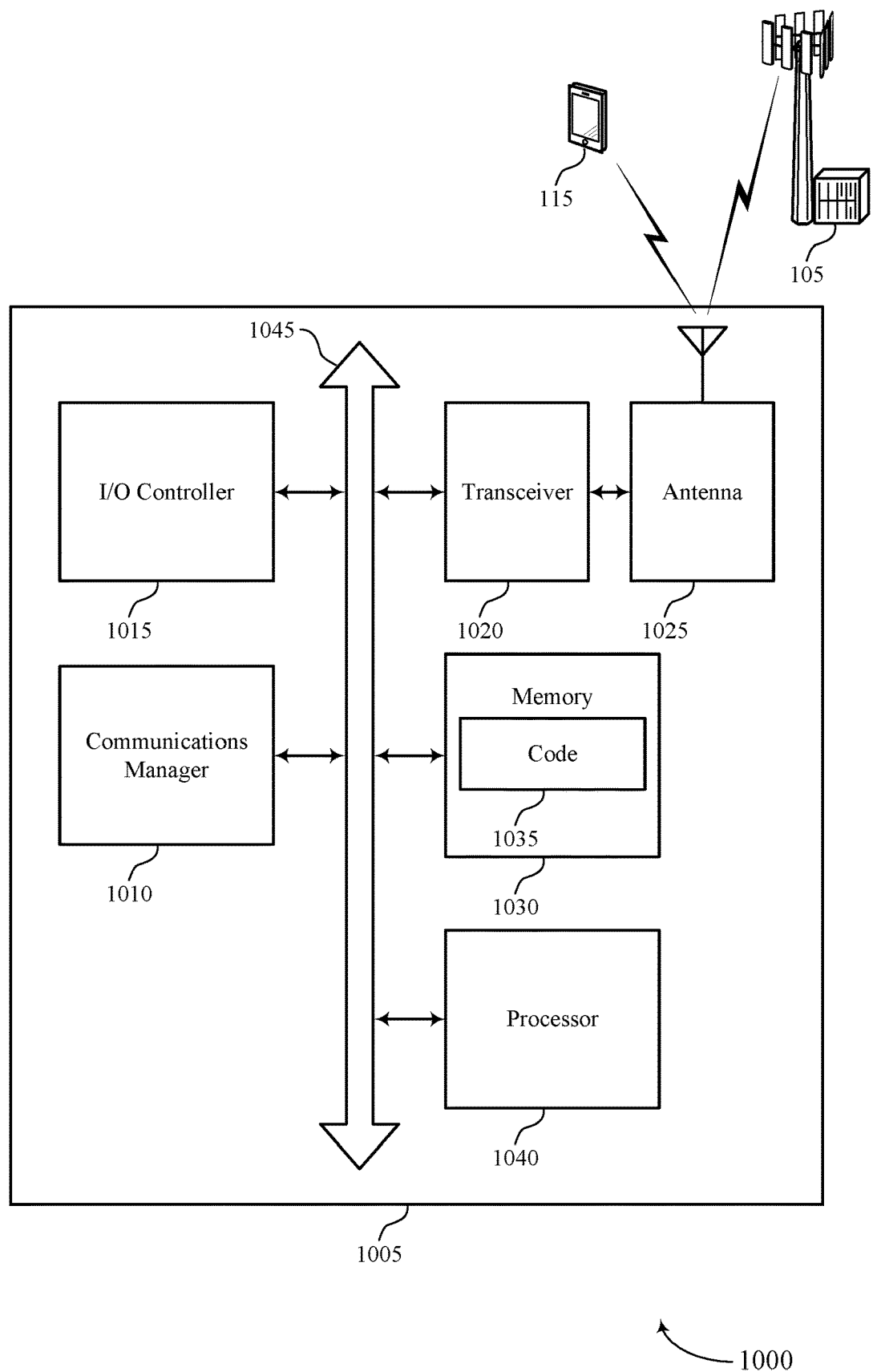
FIG. 10 shows a diagram of a system including a device that supports subband-specific codebook subset restriction in accordance with aspects of the present disclosure.

FIG. 10 shows a diagram of a system 1000 including a device 1005 that supports subband-specific codebook subset restriction in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a first configuration of one or more channel state information reference signal resources, receive a second configuration of a channel state information report associated with the one or more channel state information reference signal resources, the second configuration including at least one of an indication of a codebook, a set of codebook restriction sets, and a configured bandwidth, identify a mapping between one or more frequency-domain subbands of the configured bandwidth and each codebook restriction set of the set of codebook restriction sets, and transmit, to the base station, a report indicating one or more precoding matrix indicators from the codebook for each of the one or more frequency-domain subbands based on the mapping.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include RAM and ROM. The memory 1030 may store computer-readable, computer-executable code 1035 including instructions that, when executed, cause the processor to perform various functions described herein. In some cases, the memory 1030 may contain, among other things, a BIOS which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting subband-specific codebook subset restriction).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
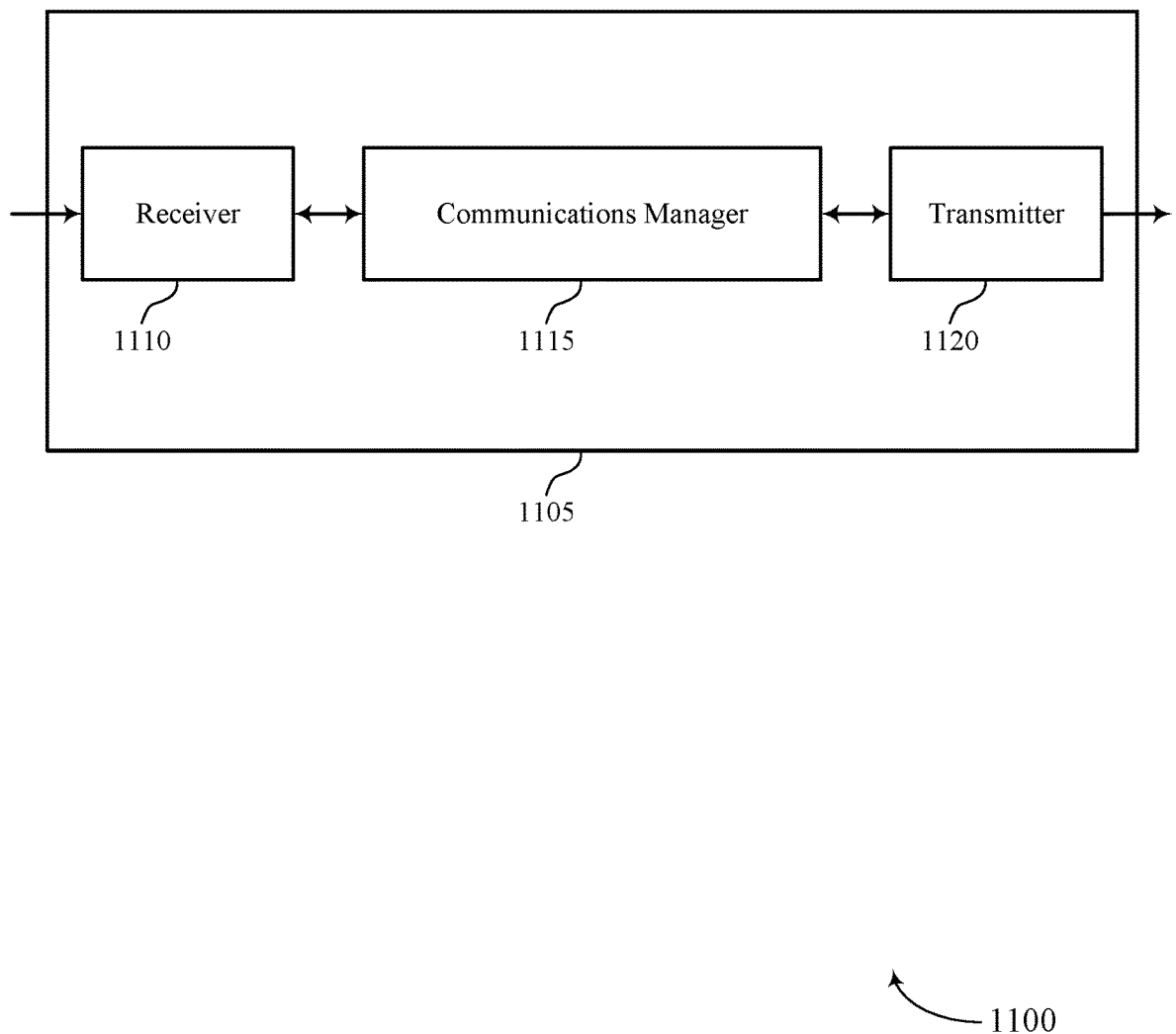
FIGS. 11 and 12 show block diagrams of devices that support subband-specific codebook subset restriction in accordance with aspects of the present disclosure.

FIG. 11 shows a block diagram 1100 of a device 1105 that supports subband-specific codebook subset restriction in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to subband-specific codebook subset restriction, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit a first configuration of one or more channel state information reference signal resources, transmit a second configuration of a channel state information report associated with the one or more channel state information reference signal resources, the second configuration including at least one of an indication of a codebook, a set of codebook restriction sets, and a configured bandwidth, identify a mapping between one or more frequency-domain subbands of the configured bandwidth and each codebook restriction set of the set of codebook restriction sets, and receive, from a UE, a report indicating one or more precoding matrix indicators from the codebook for each of the one or more frequency-domain subbands based on the mapping. The communications manager 1115 may be an example of aspects of the communications manager 1410 described herein.

The communications manager 1115, or its sub-components, may be implemented in hardware, code (e.g., software or firmware) executed by a processor, or any combination thereof. If implemented in code executed by a processor, the functions of the communications manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
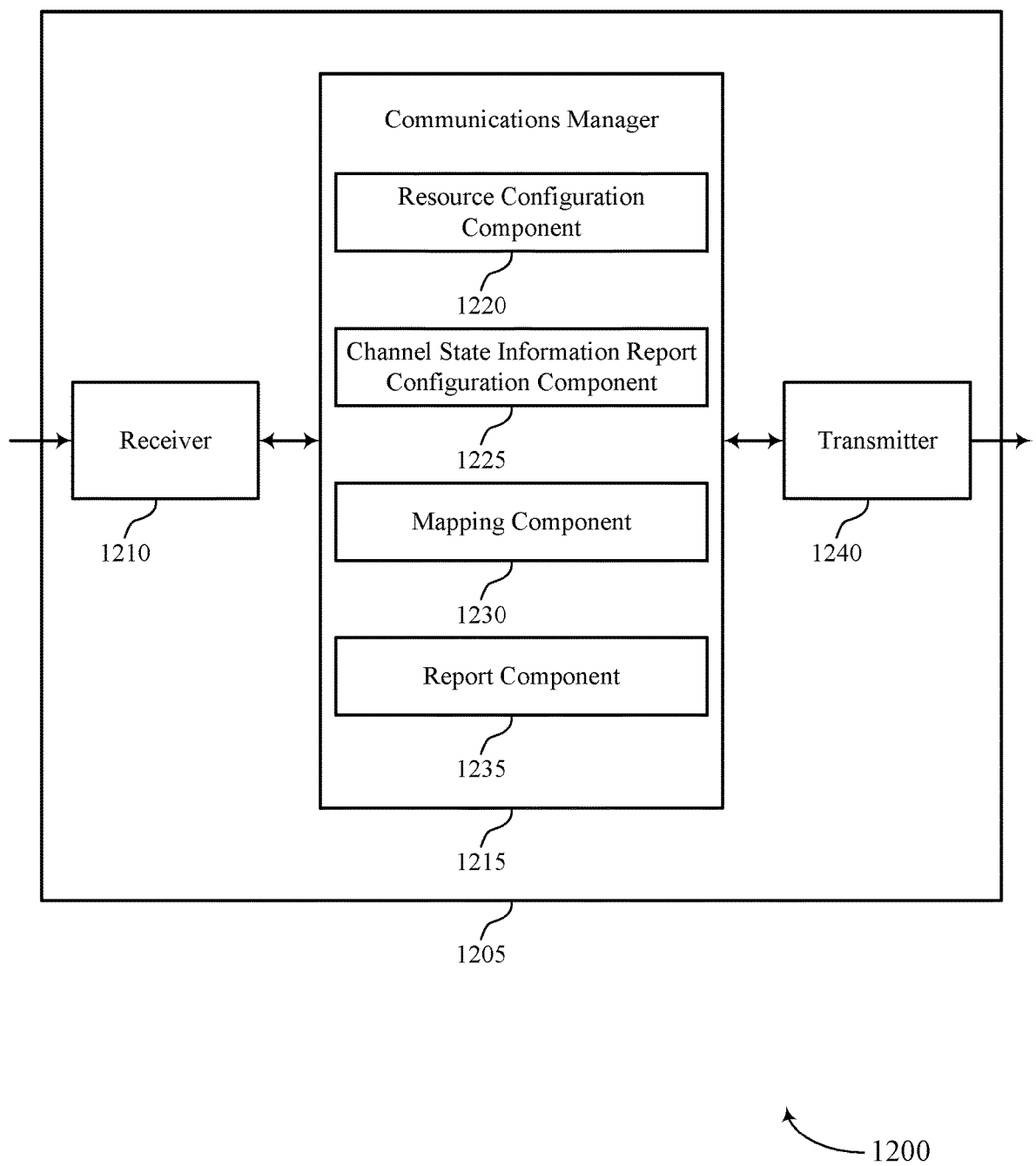

FIG. 12 shows a block diagram 1200 of a device 1205 that supports subband-specific codebook subset restriction in accordance with aspects of the present disclosure. The device 1205 may be an example of aspects of a device 1105, or a base station 105 as described herein. The device 1205 may include a receiver 1210, a communications manager 1215, and a transmitter 1240. The device 1205 may also include a processor. Each of these components may be in communication with one another (e.g., via one or more buses).

The receiver 1210 may receive information such as packets, user data, or control information associated with various information channels (e.g., control channels, data channels, and information related to subband-specific codebook subset restriction, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a resource configuration component 1220, a channel state information report configuration component 1225, a mapping component 1230, and a report component 1235. The communications manager 1215 may be an example of aspects of the communications manager 1410 described herein.

The resource configuration component 1220 may transmit a first configuration of one or more channel state information reference signal resources. The channel state information report configuration component 1225 may transmit a second configuration of a channel state information report associated with the one or more channel state information reference signal resources, the second configuration including at least one of an indication of a codebook, a set of codebook restriction sets, and a configured bandwidth.

The mapping component 1230 may identify a mapping between one or more frequency-domain subbands of the configured bandwidth and each codebook restriction set of the set of codebook restriction sets. The report component 1235 may receive, from a UE, a report indicating one or more precoding matrix indicators from the codebook for each of the one or more frequency-domain subbands based on the mapping.

The transmitter 1240 may transmit signals generated by other components of the device 1205. In some examples, the transmitter 1240 may be collocated with a receiver 1210 in a transceiver module. For example, the transmitter 1240 may be an example of aspects of the transceiver 1420 described with reference to FIG. 14. The transmitter 1240 may utilize a single antenna or a set of antennas.

Figure 13:
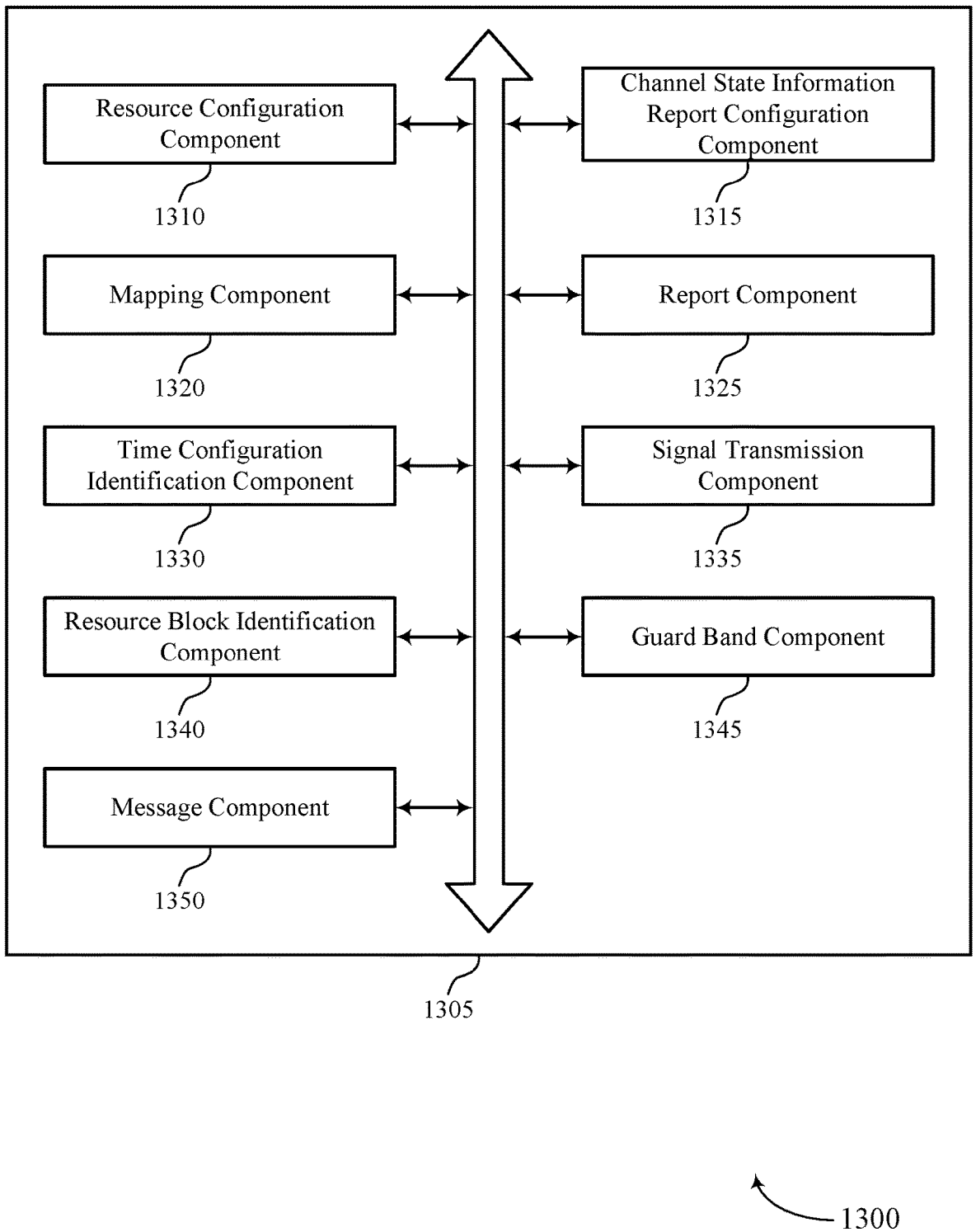
FIG. 13 shows a block diagram of a communications manager that supports subband-specific codebook subset restriction in accordance with aspects of the present disclosure.

FIG. 13 shows a block diagram 1300 of a communications manager 1305 that supports subband-specific codebook subset restriction in accordance with aspects of the present disclosure. The communications manager 1305 may be an example of aspects of a communications manager 1115, a communications manager 1215, or a communications manager 1410 described herein. The communications manager 1305 may include a resource configuration component 1310, a channel state information report configuration component 1315, a mapping component 1320, a report component 1325, a time configuration identification component 1330, a signal transmission component 1335, a resource block identification component 1340, a guard band component 1345, and a message component 1350. Each of these modules may communicate, directly or indirectly, with one another (e.g., via one or more buses).

The resource configuration component 1310 may transmit a first configuration of one or more channel state information reference signal resources. The channel state information report configuration component 1315 may transmit a second configuration of a channel state information report associated with the one or more channel state information reference signal resources, the second configuration including at least one of an indication of a codebook, a set of codebook restriction sets, and a configured bandwidth.

The mapping component 1320 may identify a mapping between one or more frequency-domain subbands of the configured bandwidth and each codebook restriction set of the set of codebook restriction sets. The report component 1325 may receive, from a UE, a report indicating one or more precoding matrix indicators from the codebook for each of the one or more frequency-domain subbands based on the mapping. In some cases, the report is associated with full-duplex communication.

The time configuration identification component 1330 may identify, based on a configuration of a time period for downlink transmissions, an uplink portion within the time period and a downlink portion within the time period, where the mapping is based on the uplink portion and the downlink portion.

In some examples, the mapping component 1320 may identify the mapping between a first codebook restriction set and a threshold number of physical resource blocks from the uplink portion within the time period. In some examples, the mapping component 1320 may identify the mapping between a second codebook restriction set and a remaining number of physical resource blocks within the time period.

The signal transmission component 1335 may transmit, to the UE, a signal indicating the threshold number of physical resource blocks. In some cases, the uplink portion includes an uplink bandwidth part and the downlink portion includes a downlink bandwidth part. In some cases, the uplink portion and the downlink portion are concurrently included in the same component carrier and the same symbol.

The resource block identification component 1340 may identify, based on a configuration of a time period for downlink transmissions, a first set of physical resource blocks associated with an uplink portion. In some examples, the resource block identification component 1340 may identify, based on the configuration of the time period, a second set of physical resource blocks associated with a downlink portion.

In some examples, the resource block identification component 1340 may determine a boundary between the uplink portion and the downlink portion, where the mapping is based on the boundary. In some cases, the first set of physical resource blocks and the second set of physical resource blocks are associated with a component carrier.

In some examples, the mapping component 1320 may identify the mapping between a first codebook restriction set and a subset of the second set of physical resource blocks located within a threshold distance from the boundary between the uplink portion and the downlink portion.

The guard band component 1345 may identify, based on a configuration of a time period for downlink transmissions, a guard band within the time period. In some examples, the guard band component 1345 may determine a threshold number of physical resource blocks from the guard band within the time period, where identifying the mapping is based on the identifying the guard band.

In some examples, the mapping component 1320 may identify the mapping between a first codebook restriction set and the threshold number of physical resource blocks from the guard band within the time period. In some examples, the mapping component 1320 may identify the mapping between a second codebook restriction set and a remaining set of frequency-domain subbands of the set of frequency-domain subbands.

In some examples, the mapping component 1320 may identify a set of frequency-domain subbands associated with a downlink bandwidth part, where identifying the mapping is based on identifying the set of frequency-domain subbands. In some examples, the mapping component 1320 may identify the mapping between a codebook restriction set with each frequency-domain subband of the set of frequency-domain subbands based on identifying the set of frequency-domain subbands.

In some examples, the mapping component 1320 may identify the mapping between a first codebook restriction set and a first set of frequency-domain subbands of the set of frequency-domain subbands.

The message component 1350 may transmit a control message to the UE. In some examples, the channel state information report configuration component 1315 may identify the set of codebook restriction sets associated with the codebook based on the control message. In some cases, the set of codebook restriction sets are associated with at least one of a single panel codebook, a multi-panel codebook, or a combination thereof.

In some examples, the message component 1350 may identify one or more bits included in the control message. In some examples, the mapping component 1320 may identify the mapping between the one or more frequency-domain subbands of the configured bandwidth and each codebook restriction set based on identifying the one or more bits.

In some examples, the mapping component 1320 may update the mapping between the one or more frequency-domain subbands of the configured bandwidth and each codebook restriction set based on the control message. In some cases, the control message includes at least one of downlink control information, a MAC control element, or a combination thereof.

In some cases, the one or more frequency-domain subbands of the configured bandwidth are contiguous. In some cases, the one or more frequency-domain subbands of the configured bandwidth are non-contiguous. In some examples, the message component 1350 may receive, from the UE, a UE capability message indicating a capability of the UE to support the set of codebook restriction sets, where the mapping is based on the UE capability message.

Figure 14:
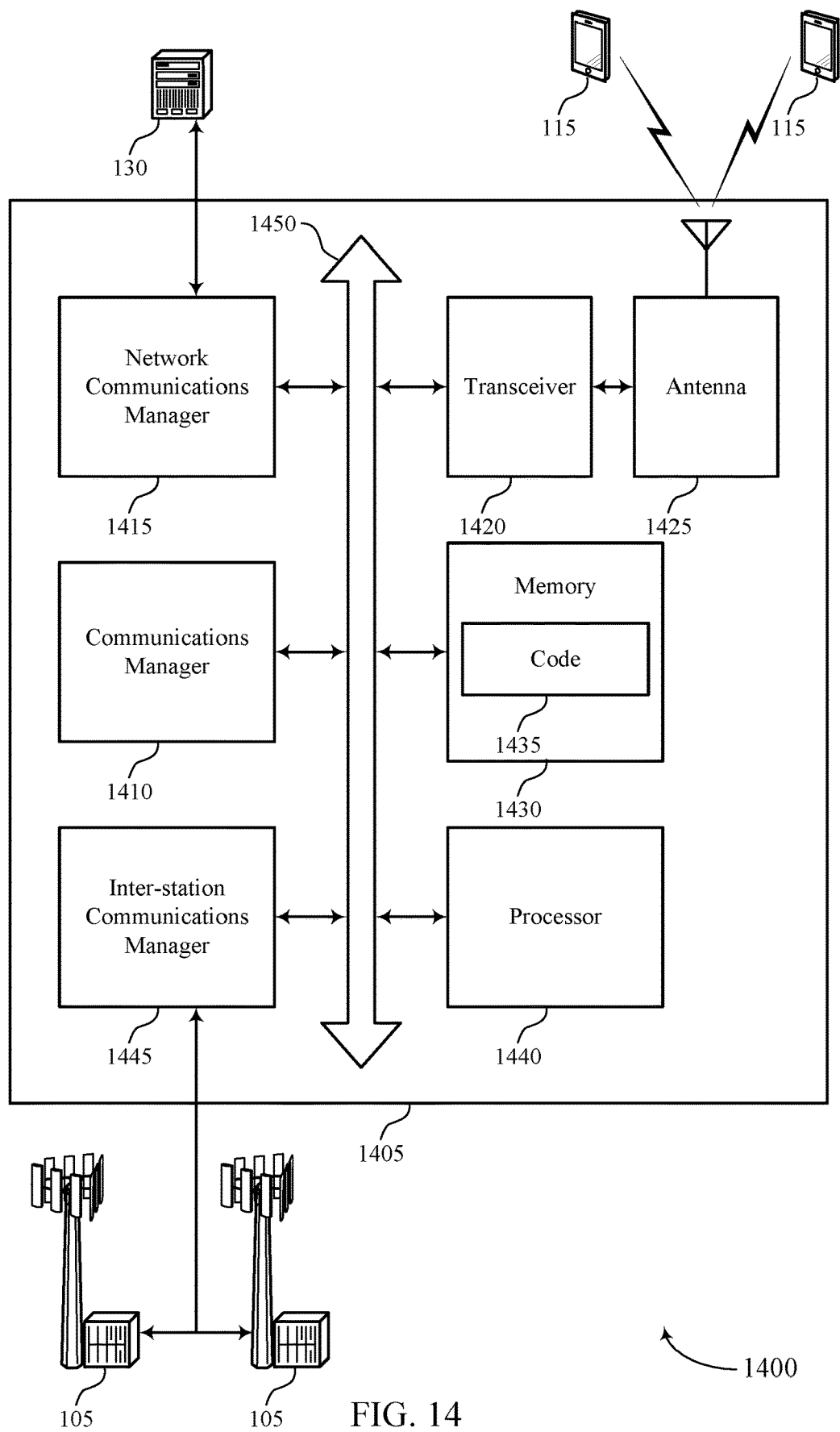
FIG. 14 shows a diagram of a system including a device that supports subband-specific codebook subset restriction in accordance with aspects of the present disclosure.

FIG. 14 shows a diagram of a system 1400 including a device 1405 that supports subband-specific codebook subset restriction in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit a first configuration of one or more channel state information reference signal resources, transmit a second configuration of a channel state information report associated with the one or more channel state information reference signal resources, the second configuration including at least one of an indication of a codebook, a set of codebook restriction sets, and a configured bandwidth, identify a mapping between one or more frequency-domain subbands of the configured bandwidth and each codebook restriction set of the set of codebook restriction sets, and receive, from a UE, a report indicating one or more precoding matrix indicators from the codebook for each of the one or more frequency-domain subbands based on the mapping.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting subband-specific codebook subset restriction).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
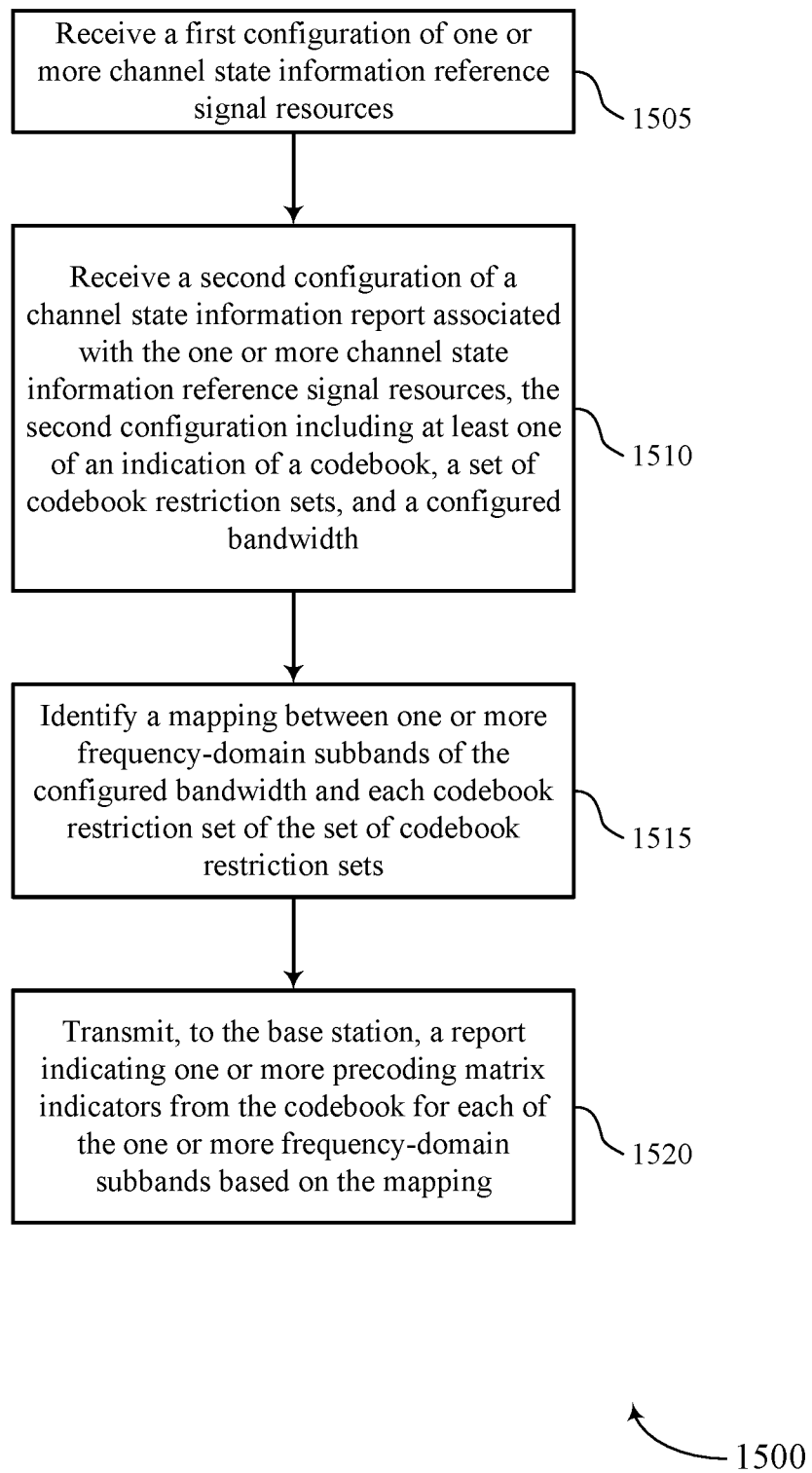
FIGS. 15 through 18 show flowcharts illustrating methods that support subband-specific codebook subset restriction in accordance with aspects of the present disclosure.

FIG. 15 shows a flowchart illustrating a method 1500 that supports subband-specific codebook subset restriction in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a first configuration of one or more channel state information reference signal resources. The operations of 1505 may be performed according to the methods described herein. In some examples, aspects of the operations of 1505 may be performed by a resource configuration component as described with reference to FIGS. 7 through 10.

At 1510, the UE may receive a second configuration of a channel state information report associated with the one or more channel state information reference signal resources, the second configuration including at least one of an indication of a codebook, a set of codebook restriction sets, and a configured bandwidth. The operations of 1510 may be performed according to the methods described herein. In some examples, aspects of the operations of 1510 may be performed by a channel state information report configuration component as described with reference to FIGS. 7 through 10.

At 1515, the UE may identify a mapping between one or more frequency-domain subbands of the configured bandwidth and each codebook restriction set of the set of codebook restriction sets. The operations of 1515 may be performed according to the methods described herein. In some examples, aspects of the operations of 1515 may be performed by a mapping component as described with reference to FIGS. 7 through 10.

At 1520, the UE may transmit, to the base station, a report indicating one or more precoding matrix indicators from the codebook for each of the one or more frequency-domain subbands based on the mapping. The operations of 1520 may be performed according to the methods described herein. In some examples, aspects of the operations of 1520 may be performed by a report component as described with reference to FIGS. 7 through 10.

Figure 16:
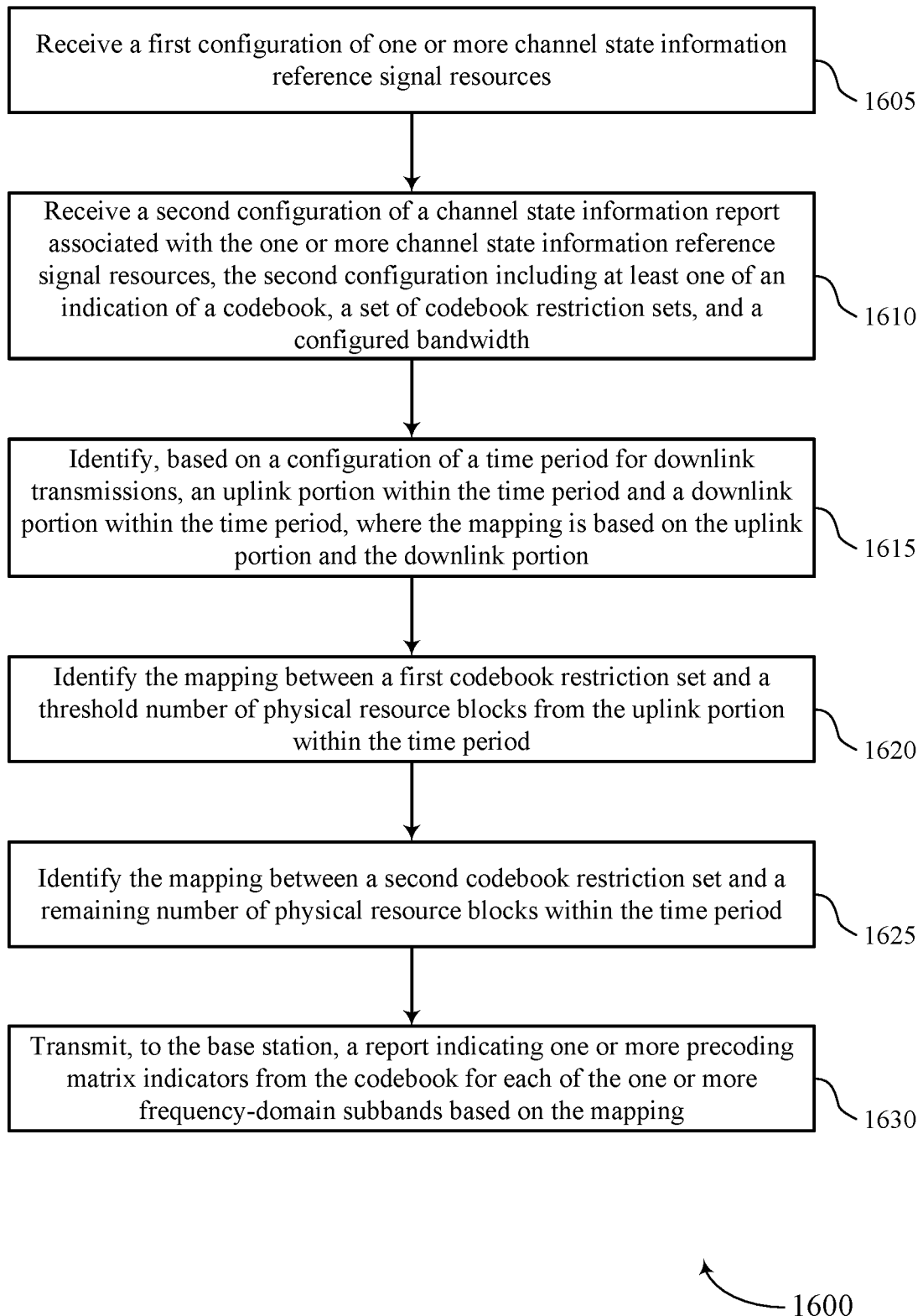

FIG. 16 shows a flowchart illustrating a method 1600 that supports subband-specific codebook subset restriction in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a first configuration of one or more channel state information reference signal resources. The operations of 1605 may be performed according to the methods described herein. In some examples, aspects of the operations of 1605 may be performed by a resource configuration component as described with reference to FIGS. 7 through 10.

At 1610, the UE may receive a second configuration of a channel state information report associated with the one or more channel state information reference signal resources, the second configuration including at least one of an indication of a codebook, a set of codebook restriction sets, and a configured bandwidth. The operations of 1610 may be performed according to the methods described herein. In some examples, aspects of the operations of 1610 may be performed by a channel state information report configuration component as described with reference to FIGS. 7 through 10.

At 1615, the UE may identify, based on a configuration of a time period for downlink transmissions, an uplink portion within the time period and a downlink portion within the time period, where the mapping is based on the uplink portion and the downlink portion. The operations of 1615 may be performed according to the methods described herein. In some examples, aspects of the operations of 1615 may be performed by a time configuration identification component as described with reference to FIGS. 7 through 10.

At 1620, the UE may identify the mapping between a first codebook restriction set and a threshold number of physical resource blocks from the uplink portion within the time period. The operations of 1620 may be performed according to the methods described herein. In some examples, aspects of the operations of 1620 may be performed by a mapping component as described with reference to FIGS. 7 through 10.

At 1625, the UE may identify the mapping between a second codebook restriction set and a remaining number of physical resource blocks within the time period. The operations of 1625 may be performed according to the methods described herein. In some examples, aspects of the operations of 1625 may be performed by a mapping component as described with reference to FIGS. 7 through 10.

At 1630, the UE may transmit, to the base station, a report indicating one or more precoding matrix indicators from the codebook for each of the one or more frequency-domain subbands based on the mapping. The operations of 1630 may be performed according to the methods described herein. In some examples, aspects of the operations of 1630 may be performed by a report component as described with reference to FIGS. 7 through 10.

Figure 17:
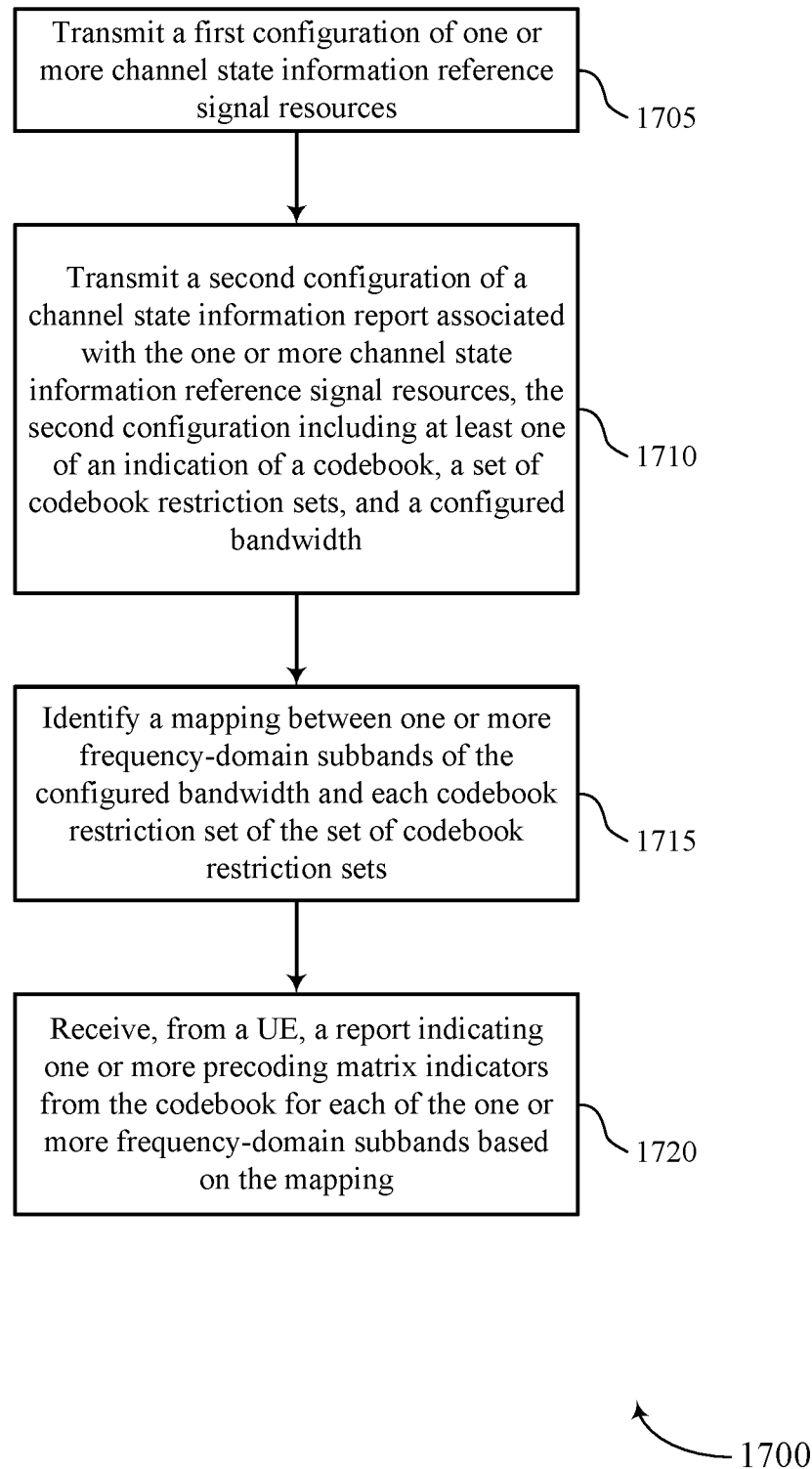

FIG. 17 shows a flowchart illustrating a method 1700 that supports subband-specific codebook subset restriction in accordance with aspects of the present disclosure. The operations of method 1700 may be implemented by a base station 105 or its components as described herein. For example, the operations of method 1700 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1705, the base station may transmit a first configuration of one or more channel state information reference signal resources. The operations of 1705 may be performed according to the methods described herein. In some examples, aspects of the operations of 1705 may be performed by a resource configuration component as described with reference to FIGS. 11 through 14.

At 1710, the base station may transmit a second configuration of a channel state information report associated with the one or more channel state information reference signal resources, the second configuration including at least one of an indication of a codebook, a set of codebook restriction sets, and a configured bandwidth. The operations of 1710 may be performed according to the methods described herein. In some examples, aspects of the operations of 1710 may be performed by a channel state information report configuration component as described with reference to FIGS. 11 through 14.

At 1715, the base station may identify a mapping between one or more frequency-domain subbands of the configured bandwidth and each codebook restriction set of the set of codebook restriction sets. The operations of 1715 may be performed according to the methods described herein. In some examples, aspects of the operations of 1715 may be performed by a mapping component as described with reference to FIGS. 11 through 14.

At 1720, the base station may receive, from a UE, a report indicating one or more precoding matrix indicators from the codebook for each of the one or more frequency-domain subbands based on the mapping. The operations of 1720 may be performed according to the methods described herein. In some examples, aspects of the operations of 1720 may be performed by a report component as described with reference to FIGS. 11 through 14.

Figure 18:
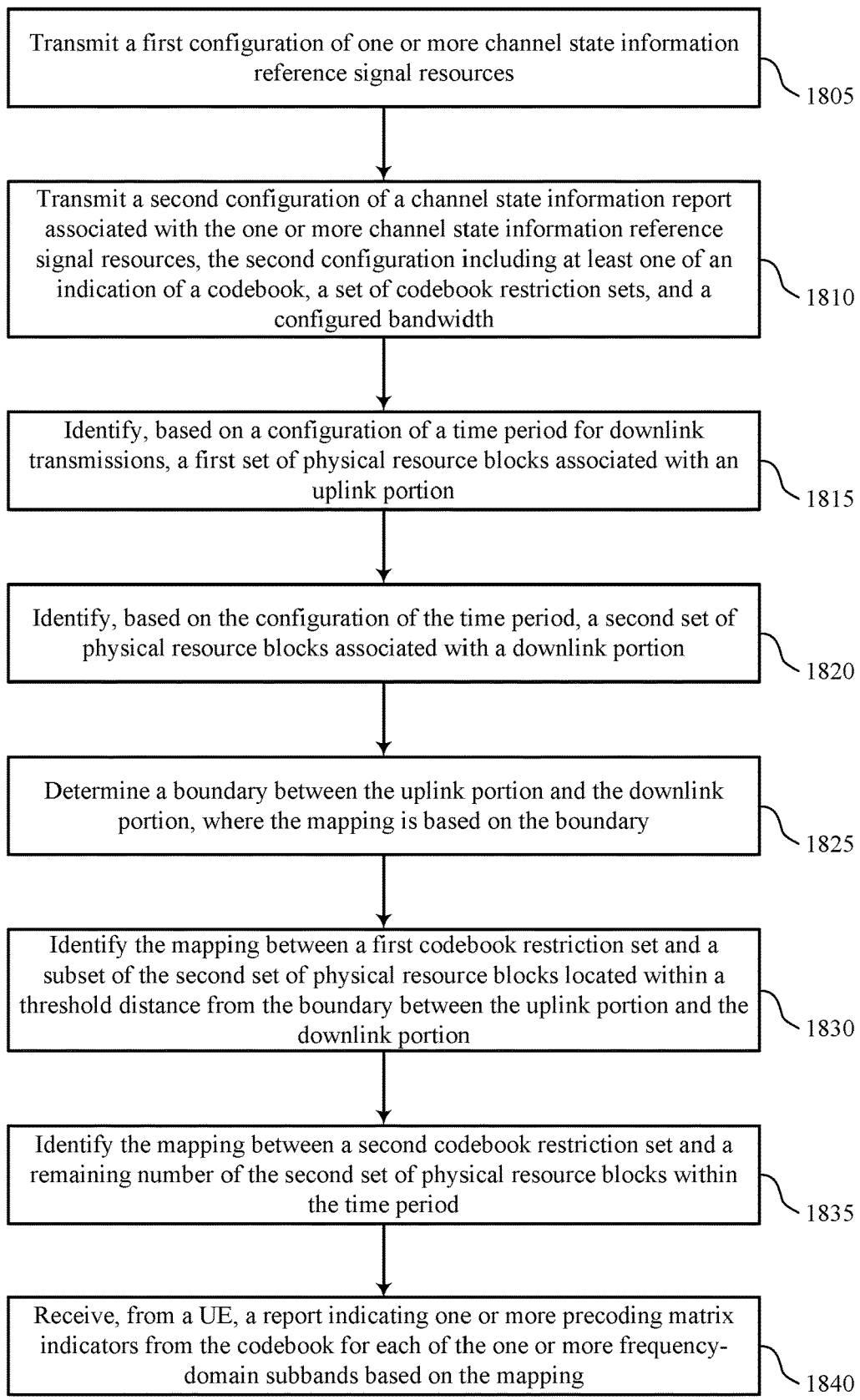

FIG. 18 shows a flowchart illustrating a method 1800 that supports subband-specific codebook subset restriction in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit a first configuration of one or more channel state information reference signal resources. The operations of 1805 may be performed according to the methods described herein. In some examples, aspects of the operations of 1805 may be performed by a resource configuration component as described with reference to FIGS. 11 through 14.

At 1810, the base station may transmit a second configuration of a channel state information report associated with the one or more channel state information reference signal resources, the second configuration including at least one of an indication of a codebook, a set of codebook restriction sets, and a configured bandwidth. The operations of 1810 may be performed according to the methods described herein. In some examples, aspects of the operations of 1810 may be performed by a channel state information report configuration component as described with reference to FIGS. 11 through 14.

At 1815, the base station may identify, based on a configuration of a time period for downlink transmissions, a first set of physical resource blocks associated with an uplink portion. The operations of 1815 may be performed according to the methods described herein. In some examples, aspects of the operations of 1815 may be performed by a resource block identification component as described with reference to FIGS. 11 through 14.

At 1820, the base station may identify, based on the configuration of the time period, a second set of physical resource blocks associated with a downlink portion. The operations of 1820 may be performed according to the methods described herein. In some examples, aspects of the operations of 1820 may be performed by a resource block identification component as described with reference to FIGS. 11 through 14.

At 1825, the base station may determine a boundary between the uplink portion and the downlink portion, where the mapping is based on the boundary. The operations of 1825 may be performed according to the methods described herein. In some examples, aspects of the operations of 1825 may be performed by a resource block identification component as described with reference to FIGS. 11 through 14.

At 1830, the base station may identify the mapping between a first codebook restriction set and a subset of the second set of physical resource blocks located within a threshold distance from the boundary between the uplink portion and the downlink portion. The operations of 1830 may be performed according to the methods described herein. In some examples, aspects of the operations of 1830 may be performed by a mapping component as described with reference to FIGS. 11 through 14.

At 1835, the base station may identify the mapping between a second codebook restriction set and a remaining number of the second set of physical resource blocks within the time period. The operations of 1835 may be performed according to the methods described herein. In some examples, aspects of the operations of 1835 may be performed by a undefined as described with reference to FIGS. 11 through 14.

At 1840, the base station may receive, from a UE, a report indicating one or more precoding matrix indicators from the codebook for each of the one or more frequency-domain subbands based on the mapping. The operations of 1840 may be performed according to the methods described herein. In some examples, aspects of the operations of 1840 may be performed by a report component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication, comprising:
   a processor; and
   memory coupled with the processor, wherein the processor is configured to:
   receive a first configuration of one or more channel state information reference signal resources;
   receive a second configuration of a channel state information report associated with the one or more channel state information reference signal resources, the second configuration comprising at least one of an indication of a codebook, a plurality of codebook restriction sets, and a configured bandwidth;
   identify, based at least in part on a configuration of a time period for downlink transmissions, an uplink portion within the time period and a downlink portion within the time period; and
   transmit, based at least in part on a mapping between one or more frequency-domain subbands of the configured bandwidth and each codebook restriction set of the plurality of codebook restriction sets, a report indicating one or more precoding matrix indicators from the codebook for each of the one or more frequency-domain subbands, wherein the mapping is based at least in part on the uplink portion and the downlink portion, and wherein the mapping includes:
   a first mapping between a first codebook restriction set and a threshold number of physical resource blocks from the uplink portion within the time period, and
   a second mapping between a second codebook restriction set and a remaining number of physical resource blocks within the time period.

2. The apparatus of claim 1, wherein the processor is configured to:
   receive a signal indicating the threshold number of physical resource blocks.

3. The apparatus of claim 1, wherein the uplink portion comprises an uplink bandwidth part and the downlink portion comprises a downlink bandwidth part.

4. The apparatus of claim 1, wherein the uplink portion and the downlink portion are concurrently included in the same component carrier and the same symbol.

5. The apparatus of claim 1,
   wherein the mapping is based at least in part on a boundary between the uplink portion and the downlink portion.

6. The apparatus of claim 5, wherein the first set of physical resource blocks and the second set of physical resource blocks are associated with a component carrier.

7. The apparatus of claim 1, wherein a plurality of frequency-domain subbands is associated with a downlink bandwidth part, wherein the mapping is based at least in part on the plurality of frequency-domain subbands.

8. The apparatus of claim 7, wherein
   the mapping is based at least in part on the plurality of frequency-domain subbands.

9. The apparatus of claim 1, wherein the processor is configured to:
   receive a control message, wherein the plurality of codebook restriction sets is based at least in part on the control message.

10. The apparatus of claim 9, wherein the mapping is based at least in part on one or more bits of the control message.

11. The apparatus of claim 9, wherein the control message comprises at least one of downlink control information, a media access control (MAC) control element, or a combination thereof.

12. The apparatus of claim 1, wherein the processor is configured to:
    receive a control message; and
    update the mapping based at least in part on the control message.

13. The apparatus of claim 1, wherein the processor is configured to:
    transmit a capability message indicating a capability of the apparatus to support the plurality of codebook restriction sets, wherein the mapping is based at least in part on the capability message.

14. The apparatus of claim 1, wherein the plurality of codebook restriction sets is associated with at least one of a single panel codebook, a multi-panel codebook, or a combination thereof.

15. The apparatus of claim 1, wherein the report is associated with full-duplex communication.

16. The apparatus of claim 1, wherein the one or more frequency-domain subbands of the configured bandwidth are contiguous.

17. The apparatus of claim 1, wherein the one or more frequency-domain subbands of the configured bandwidth are non-contiguous.

18. An apparatus for wireless communication, comprising:
    a processor; and
    memory coupled with the processor, wherein the processor is configured to:
    receive a first configuration of one or more channel state information reference signal resources;
    receive a second configuration of a channel state information report associated with the one or more channel state information reference signal resources, the second configuration comprising at least one of an indication of a codebook, a plurality of codebook restriction sets, and a configured bandwidth;
    identify, based at least in part on a configuration of a time period for downlink transmissions, a first set of physical resource blocks associated with an uplink portion;
    identify, based at least in part on the configuration of the time period, a second set of physical resource blocks associated with a downlink portion; and
    transmit, based at least in part on a mapping between one or more frequency-domain subbands of the configured bandwidth and each codebook restriction set of the plurality of codebook restriction sets, a report indicating one or more precoding matrix indicators from the codebook for each of the one or more frequency-domain subbands, wherein the mapping is based at least in part on a boundary between the uplink portion and the downlink portion, and wherein the mapping includes:
  a first mapping between a first codebook restriction set and a subset of the second set of physical resource blocks located within a threshold distance from the boundary between the uplink portion and the downlink portion; and
  a second mapping between a second codebook restriction set and a remaining number of the second set of physical resource blocks within the time period.

19. An apparatus for wireless communication, comprising:
  a processor; and
  memory coupled with the processor, wherein the processor is configured to:
    receive a first configuration of one or more channel state information reference signal resources;
    receive a second configuration of a channel state information report associated with the one or more channel state information reference signal resources, the second configuration comprising at least one of an indication of a codebook, a plurality of codebook restriction sets, and a configured bandwidth;
    identify, based at least in part on a configuration of a time period for downlink transmissions, a guard band within the time period;
    determine a threshold number of physical resource blocks from the guard band within the time period; and
    transmit, based at least in part on a mapping between one or more frequency-domain subbands of the configured bandwidth and each codebook restriction set of the plurality of codebook restriction sets, a report indicating one or more precoding matrix indicators from the codebook for each of the one or more frequency-domain subbands, wherein the mapping is based at least in part on the guard band, and wherein the mapping includes:
      a first mapping between a first codebook restriction set and the threshold number of physical resource blocks from the guard band within the time period; and
      a second mapping between a second codebook restriction set and a remaining number of physical resource blocks within the time period.

* * * * *